US012611718B2

(12) United States Patent
Erlich et al.

(10) Patent No.: US 12,611,718 B2
(45) Date of Patent: Apr. 28, 2026

(54) COOLANT CONDUIT FOR A PARTING-OFF TOOL ASSEMBLY

(71) Applicant: ISCAR, LTD., Tefen (IL)

(72) Inventors: Ely Erlich, Karmiel (IL); Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 507 days.

(21) Appl. No.: 18/032,602

(22) PCT Filed: Oct. 18, 2021

(86) PCT No.: PCT/IL2021/051228
§ 371 (c)(1),
(2) Date: Apr. 19, 2023

(87) PCT Pub. No.: WO2022/084988
PCT Pub. Date: Apr. 28, 2022

(65) Prior Publication Data
US 2023/0381868 A1 Nov. 30, 2023

Related U.S. Application Data

(60) Provisional application No. 63/093,880, filed on Oct. 20, 2020.

(51) Int. Cl.
*B23B 27/10* (2006.01)
*B23B 27/04* (2006.01)

(52) U.S. Cl.
CPC .............. *B23B 27/10* (2013.01); *B23B 27/04* (2013.01)

(58) Field of Classification Search
CPC ... B23B 27/10; B23B 27/1666; B23B 27/086; B23B 27/04; B23B 27/08; B23B 29/043;
(Continued)

(56) References Cited

U.S. PATENT DOCUMENTS 354,498 A * 12/1886 Kerchove ............... B23B 27/10
29/DIG. 8
3,234,828 A * 2/1966 Johnson ............. B23Q 17/2225
82/158
(Continued)

FOREIGN PATENT DOCUMENTS

CN 113059203 A * 7/2021 ............. B23B 27/16
DE 19634062 A1 * 2/1998 ......... B23B 27/1666
(Continued)

OTHER PUBLICATIONS

International Search Report dated Mar. 3, 2022 issued in PCT/IL2021/051228.
Written Opinion dated Mar. 3, 2022 issued in PCT/IL2021/051228.

*Primary Examiner* — Nicole N Ramos
(74) *Attorney, Agent, or Firm* — Womble Bond Dickinson (US) LLP

(57) ABSTRACT

A parting-off tool assembly including a blade holder, a parting-blade mounted to, and clamped by, the blade holder, a cutting insert and a coolant conduit mounted to the parting-blade. The cutting insert defining a cutting-edge width CW and an extended-width cutting plane of the same width. The coolant conduit with an outlet opening out to a first extension portion located within the extended-width cutting plane.

26 Claims, 14 Drawing Sheets

(58) Field of Classification Search
CPC ... B23B 2205/02; B23B 2205/12; B23C 5/28;
B23Q 11/10
See application file for complete search history.

(56)                    References Cited

U.S. PATENT DOCUMENTS

| | | | | |
|---|---|---|---|---|
| 3,596,337 | A * | 8/1971 | Arnold | B23B 27/08 |
| | | | | 407/91 |
| 3,731,565 | A * | 5/1973 | Barkhurst | B23B 29/043 |
| | | | | 82/158 |
| 3,798,725 | A * | 3/1974 | Hanson | B23B 29/04 |
| | | | | 82/158 |
| 3,808,656 | A * | 5/1974 | Lindskog | B23Q 11/10 |
| | | | | 407/92 |
| 5,265,505 | A * | 11/1993 | Frechette | B23Q 1/0018 |
| | | | | 82/159 |
| 5,709,508 | A | 1/1998 | Barazani et al. | |
| 6,045,300 | A * | 4/2000 | Antoun | B23C 5/28 |
| | | | | 407/11 |
| 6,299,388 | B1 * | 10/2001 | Slabe | B23B 27/10 |
| | | | | 407/100 |
| 7,762,166 | B2 * | 7/2010 | Giannetti | B23Q 11/10 |
| | | | | 407/11 |
| 9,259,788 | B2 * | 2/2016 | Malka | B23B 27/10 |

| | | | | |
|---|---|---|---|---|
| 2008/0083307 | A1 * | 4/2008 | Giannetti | B23B 29/246 |
| | | | | 82/157 |
| 2011/0305531 | A1 * | 12/2011 | Amstibovitsky | B23B 27/10 |
| | | | | 407/11 |
| 2013/0236253 | A1 * | 9/2013 | Malka | B23B 27/10 |
| | | | | 407/11 |
| 2014/0334887 | A1 * | 11/2014 | Flolo | B23B 27/1666 |
| | | | | 407/11 |
| 2015/0321263 | A1 | 11/2015 | Thelin et al. | |
| 2017/0326650 | A1 | 11/2017 | Schwagerle et al. | |
| 2019/0314902 | A1 * | 10/2019 | Herman | B23B 27/14 |

FOREIGN PATENT DOCUMENTS

| | | | | | |
|---|---|---|---|---|---|
| DE | 202015103597 | U1 * | 7/2015 | ....... | B23B 29/03403 |
| EP | 0791420 | A1 * | 8/1997 | ............. | B23Q 11/10 |
| EP | 2789415 | A1 * | 10/2014 | ........ | B23B 27/1677 |
| FR | 2724337 | A1 * | 3/1996 | ............ | B23B 27/10 |
| FR | 3034696 | A1 * | 10/2016 | ........... | B23B 29/04 |
| GB | 1369096 | A * | 10/1974 | ........... | B23B 27/08 |
| GB | 2139529 | A * | 11/1984 | ........... | B23B 27/08 |
| JP | H0325850 | Y2 * | 6/1991 | | |
| JP | 2020127982 | A * | 8/2020 | | |
| KR | 20180078410 | A * | 7/2018 | ........... | B23B 27/06 |
| WO | WO-9513159 | A1 * | 5/1998 | ........... | B23Q 7/047 |
| WO | WO-9848963 | A1 * | 11/1998 | ........... | B23Q 11/10 |

* cited by examiner

200

272B   272A   262A   230   264A   260A 270B   270A   232

200

DS1   DS2

314C

TG 306B   306A 238B   238A

200

308   274B   262B   304   274A   μ1   268A   208   μ2   233B   314C   222

ε   PR1   280A   266A   278A   AE1   306

278A   282A   HB   224

DU1

DF1   DR1   226   228

DD1   202

300,310   266B   238A 316C   234

210   268B   233A   238

314B,   314A, 316B   316A   220   302

200   PS

248

280B,   278B 294B   280B,

294B 290B   245

302C   302D

302B 200   264B   260B   302A

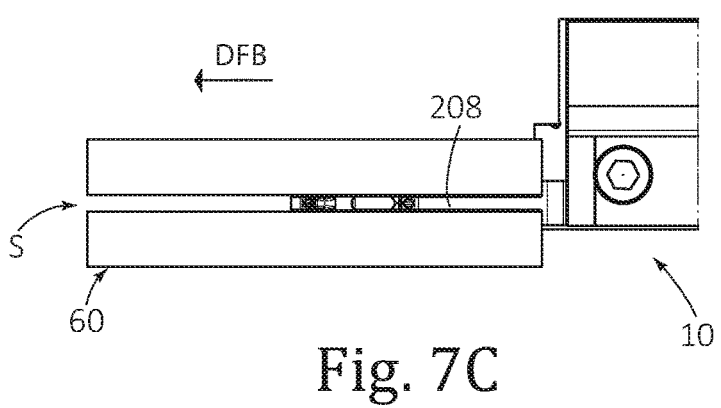
Fig. 7C
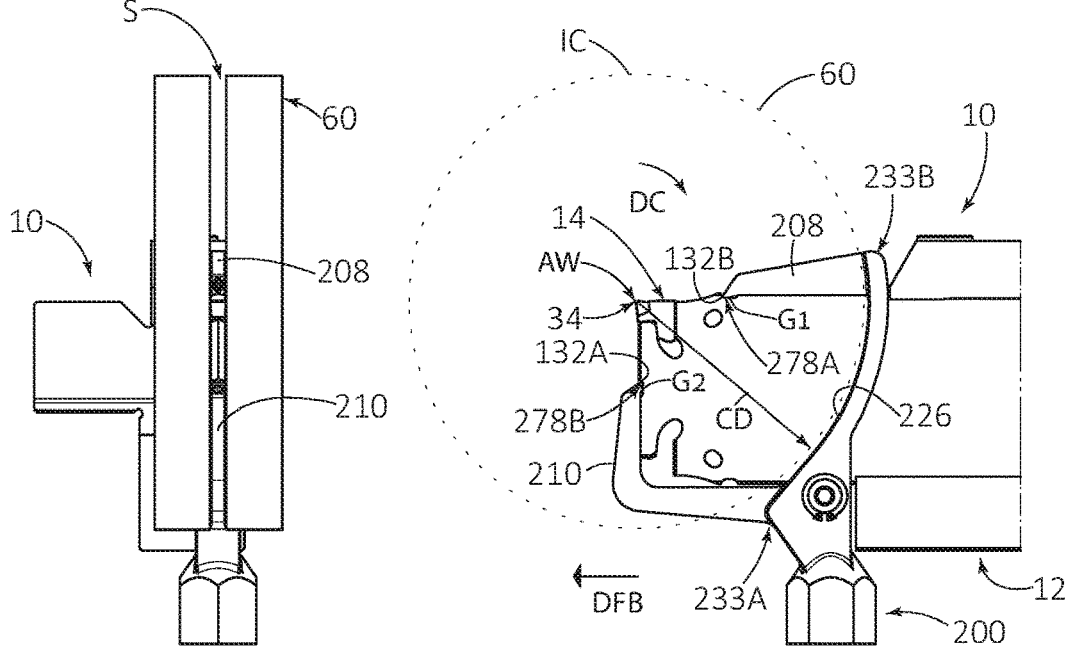
Fig. 7B
Fig. 7A
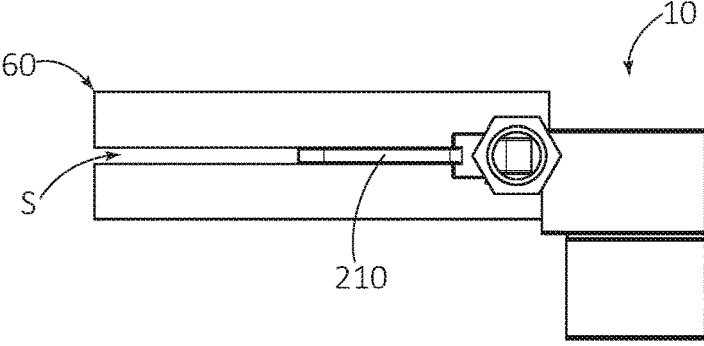
Fig. 7D

200`
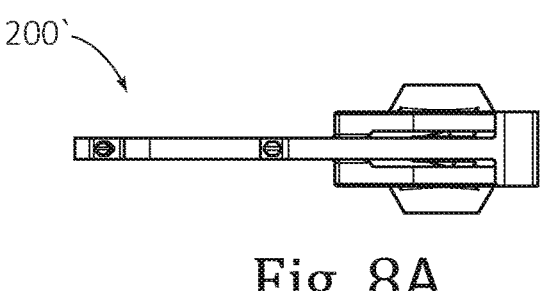
Fig. 8A
200`                    200`                    200`
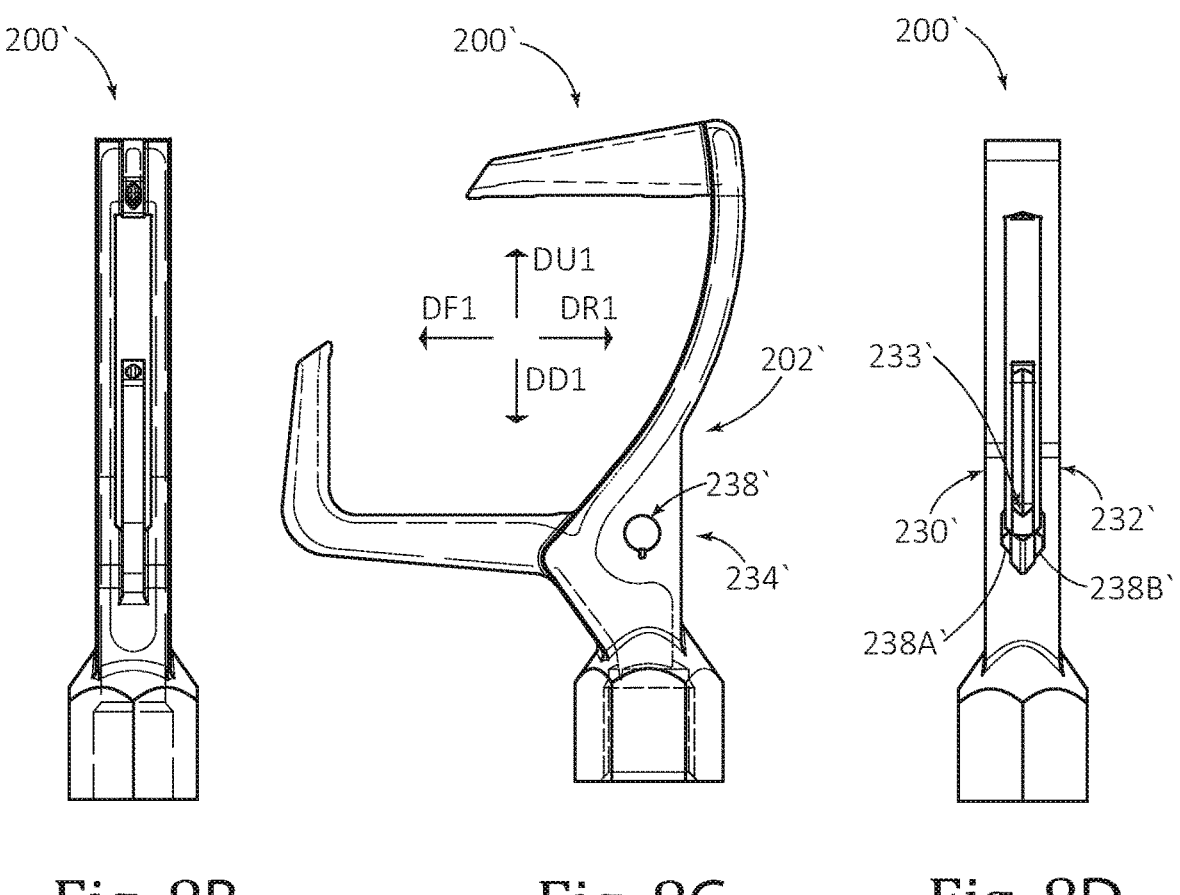
DU1
DF1          DR1
DD1
202`
238`
234`
233`
230`          232`
238A`          238B`
Fig. 8B          Fig. 8C          Fig. 8D
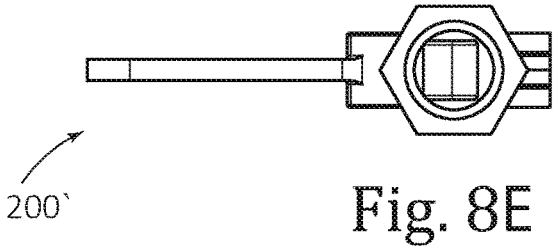
200`          Fig. 8E

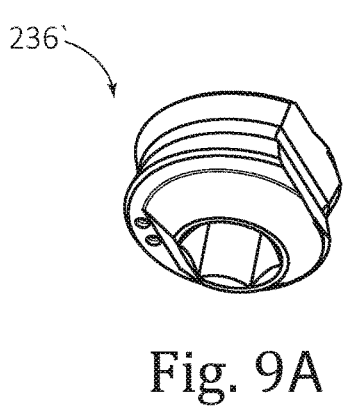
Fig. 9A
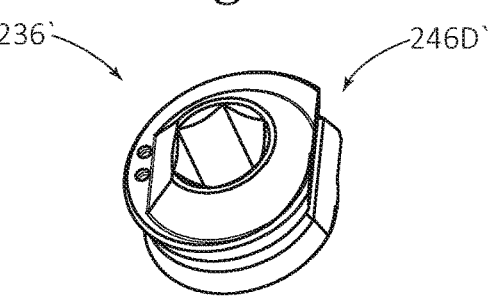
Fig. 9B
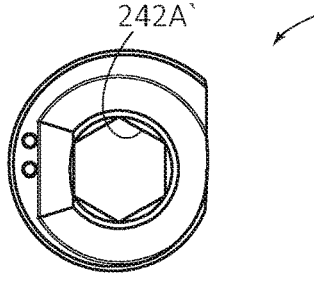
Fig. 10A
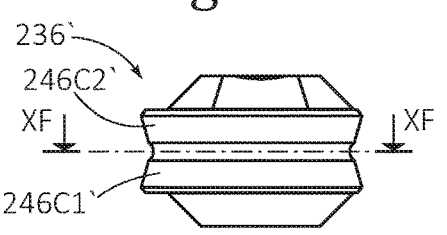
Fig. 10E
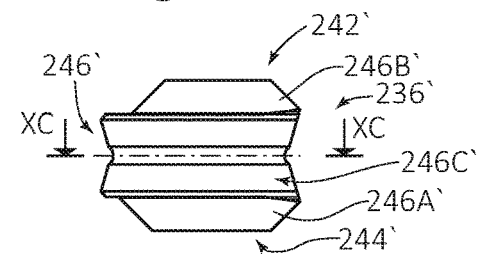
Fig. 10B
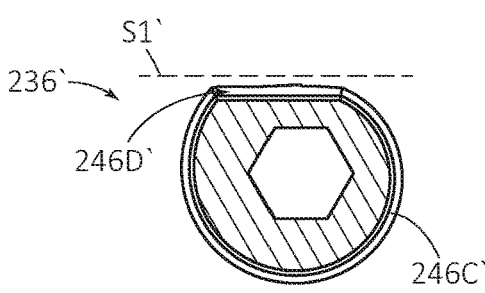
Fig. 10F
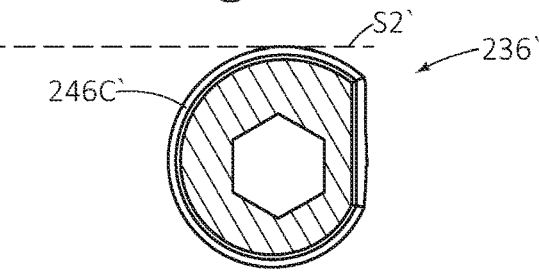
Fig. 10C
Fig. 10D

COOLANT CONDUIT FOR A PARTING-OFF TOOL ASSEMBLY

RELATED APPLICATIONS

This is a 35 USC 371 U.S. National Phase of International Application No. PCT/IL2021/051228 filed 20 Oct. 2021 and published in English as WO 2022/084988A2 on 28 Apr. 2022, which claims priority to U.S. Provisional Patent Application No. 63/093,880, filed 20 Oct. 2020. The contents of the aforementioned applications are incorporated by reference in their entirety.

FIELD OF THE INVENTION

The subject matter of the present application relates to a coolant conduit configured to convey coolant towards a cutting insert, and more particularly a coolant conduit configured for use with a parting-blade and blade holder, as well as a tool assembly comprising same, methods of assembly and machining therewith.

BACKGROUND OF THE INVENTION

The present application relates to a tool assembly for parting (also called "parting-off" or "cut-off") operations. Nonetheless, it will be understood that a tool assembly which can carry out parting can also carry out grooving operations.

Traditional parting-blades are elongated to provide a large depth of cut capability. Typically, such parting-blade is elongated with tapered longitudinal edges to allow strong clamping, while still able to be advantageously adjusted for different overhang lengths.

The present applicant has also further described parting tool assemblies in US 2019/0240741 assigned to the present applicant. In said publication, for example referring to FIGS. 17 to 20 therein, a square, regular-shaped, parting-blade and holder are described. Such tool assembly forgoes the advantage of adjustable overhang lengths for a more stable mounting arrangement.

Nonetheless, there are numerous features in US 2019/0240741 which could be improved. For example, coolant is only provided to one side of the cutting insert due to the difficulty of providing coolant to both sides of the cutting insert in a regular-shaped blade with insert pockets on each corner (and the inlets of the blades being at a non-central position to maximize depth of cut). Additionally, the screws and plugs which are used to securely mount the blade cause a significant lateral projection preventing the blade from parting "close to shoulder". Additionally, providing internal coolant holes in parting-blades is an expensive and difficult manufacturing task.

Regarding the provision of coolant, as with all machine tools, it is beneficial to cool a cutting insert during machining to increase the tool-life thereof.

Unlike other tools, there are unique difficulties in providing coolant to cutting inserts held by parting-blades. Namely, parting-blades are preferably as thin as possible (to reduce wastage of material) and enter deep within a workpiece. Provision of coolant is less effective with increased distance from a coolant outlet. Additionally, since the cutting insert is completely surrounded by the workpiece, it is not effective to provide a coolant nozzle at the side of the cutting insert. Further, chips flow above the cutting insert deflecting coolant from above.

Numerous solutions have been provided to overcome the above said difficulties. For example, in the past coolant was provided by an external conduit (used for many different tools) spaced apart from the parting-blade, however this is not particularly effective and chips and the workpiece obstruct coolant from reaching the cutting insert. Another solution is to form a coolant passageway within the parting-blade, and direct the coolant through the parting-blade, which as mentioned before is expensive. Yet another solution is to direct the coolant through the parting-blade and also through the cutting insert, which makes the production of the cutting insert complex. Still another solution was to provide coolant only to a rear end of a cutting insert to avoid the coolant flow being obstructed by chips.

The most popular solution, recently, has been to provide high-pressure coolant through the parting-blade (most such blades and blade holders on the market being designated to provide coolant up to 70 bar, and the present Applicant's product is configured to provide coolant up to even 140 bar). However, while high pressure coolant through the blade overcomes the problem of allowing coolant to reach the essential area to be cooled, such passageways internal to the blade are produced through an expensive and slow manufacturing process. Since blades have a limited tool life and are then disposed of relatively quickly once the, typically resilient, insert pockets are worn, this makes the cost of such passageways in a disposable blade a significant consideration. Resilient insert pockets are typically used due to lack of room for screws in extremely thin, preferred, parting-blade widths.

While indexable inserts are an alternative to parting-blades, they are smaller due to the insert material being far more expensive than the typically steel blades, and it is difficult or impractical to press extremely large inserts. Since the cutting inserts are smaller, coolant supplied directly from a tool holder is more effective than it is for parting-blades with larger depths of cut (i.e. the cutting edge is comparatively further from the tool holder), and this is less of an issue. The present application is specifically directed to parting-blades due to the unique difficulty of providing effective coolant to a cutting edge a comparatively large distance from a tool holder.

It is an object of the present invention to provide an improved coolant conduit, parting-blade and tool assembly comprising same.

SUMMARY OF THE INVENTION

The present invention is directed to a coolant conduit configured to be fastened to a parting-blade.

Stated differently, the present invention is a coolant conduit securely mounted on a parting-blade such that the outlet thereof is proximate to the cutting insert to effectively provide coolant thereto.

It will be understood from the drawings and various terms such as "fastened to" or "mounted" or "suspended", that, as the name "coolant conduit" implies, the present invention is not a clamp configured with a clamping function, i.e. it is not designed to secure the parting-blade to the tool holder and is devoid of any parting-blade clamping function. That is, other than the coolant conduit being configured to be fastened to the parting-blade itself. In preferred embodiments the coolant conduit only contacts the parting-blade (and therefore does not contact the tool holder). Stated differently, when it is stated that a parting-blade is mounted to the blade holder, it means that the parting-blade is clamped to the blade holder by the blade holder (i.e. the blade holder is the only component of the tool assembly that clamps the parting-blade). However, this does not mean that the coolant conduit cannot contact or be secured to the blade holder, merely that the component providing clamping forces to hold the parting-blade to the blade holder while machining is not the coolant conduit. Stated differently, the parting-blade is clamped to the blade holder regardless of whether the coolant conduit is mounted to the parting-blade or not. It will be understood that some embodiments define a coolant conduit which only contacts the parting-blade (i.e. it does not contact the blade holder).

A portion of the coolant conduit can enter within the envelope of a narrow slit within the workpiece being parted and towards oncoming chips.

A number of unique safety mechanisms were developed to ensure that chips being machined would not dislodge or damage the coolant conduit.

Such coolant conduit was found to be advantageous of the above-mentioned regular-shaped blade concept with coolant only provided to one side. Additionally, since the coolant conduit does not undergo wear from machining forces (in contrast with parting-blades with internal coolant holes) it can be remounted on many different parting-blades, which are now cheaper and simpler to produce due to them not requiring internal coolant holes. Similarly, since the coolant conduit does not undergo wear from strong clamping forces, i.e. it is not a clamp which clamps the blade to a blade holder, although it does have a relatively moderate fastening function merely to hold it in place on the parting-blade, it can be reused on many parting-blades. it Additionally, it was discovered that unlike the above-mentioned parting-blades with coolant holes which are limited to at most 140 bar pressure, the coolant conduit can be supplied at an inlet thereof with higher coolant pressures (resulting in a greater coolant supply and hence cutting insert tool life is extended even more).

The coolant conduit can advantageously be used with standard blade holders, even those which are not configured with coolant holes, reducing acquisition costs for a manufacturer.

Additionally, the coolant conduit can be used with standard (typically elongated) parting-blades. However, an improved parting-blade has been developed with at least one safety feature to ensure safe mounting of the coolant conduit to the parting-blade.

It should be understood that the term "coolant conduit" could alternatively be called a "coolant accessory". In other words the coolant conduit is not an integral part of a parting-blade or other tool and has no clamping or machining function other than to provide coolant to a desired location. Stated differently, the coolant conduit or coolant accessory of the present invention if removed from any tool assembly, does not affect the basic machining function of the assembly. I.e. the assembly can machine without it, albeit that no coolant or less coolant (if there is another coolant construction available) will be provided to the desired location.

To further clarify that the coolant conduit is not integrally formed with the machining component of the tool assembly, it will be understood that each coolant conduit has at least one inlet, at least one outlet, and at least one coolant passageway extending from the at least one inlet to the at least one outlet. Furthermore, the coolant conduit further comprises a wall or envelope surrounding the coolant passageway (so that coolant from the at least one inlet can reach and exit the at least one outlet).

Further independently unique aspects developed are listed below.

According to an aspect of the present invention, there is provided a tool assembly comprising a blade holder, a parting-blade and a coolant conduit; the coolant conduit being fastened to the parting-blade.

Stated differently, the parting-off tool assembly comprises: a blade holder; a parting-blade clamped to the blade holder by the blade holder, and comprising an insert pocket; and a coolant conduit fastened to the parting-blade.

According to a more detailed aspect of the present invention, there is provided a tool assembly comprising a blade holder; a parting-blade mounted to, and clamped by, the blade holder, and comprising at least a first insert pocket; a cutting insert mounted to the first insert pocket; and a coolant conduit mounted to the parting-blade; the cutting insert comprising: a forwardmost cutting edge defining a cutting edge width CW and an extended-width cutting plane which is the same width as the cutting edge width CW; the parting-blade comprising: opposing first and second blade sides and a peripheral blade edge connecting the first and second blade sides; and the at least first insert pocket being formed along the peripheral blade edge; the peripheral blade edge comprising: first and second blade sub-edges extending from different sides of the first insert pocket; the coolant conduit comprising: at least a first extension portion; at least one inlet; at least one outlet; and at least one coolant passageway extending from the at least one inlet to the at least one outlet; wherein the at least one outlet opens out at the first extension portion and is located within the extended-width cutting plane.

Preferably the coolant conduit contacts only the parting-blade. Stated differently the coolant conduit can be devoid of contact of the blade holder.

Preferably, the coolant conduit contacts a blade sub-edge of the parting-blade. Preferably, the coolant conduit contacts only blade sub-edges of the parting-blade.

Preferably the coolant conduit is configured to contact only an overhanging portion of a parting-blade.

Preferably the entire coolant conduit is located more in the cutting direction than the blade. Alternatively, the coolant conduit can encircle the blade holder. Yet another feasible possibility is that the coolant conduit extends alongside the blade holder.

The coolant conduit can comprise a fastening portion to fasten the coolant conduit to the parting-blade.

Alternatively, the coolant conduit can be configured for a pressure-fit to a parting-blade (i.e. and hence be devoid of a fastening portion). For example, a coolant conduit can comprise parallel extension portions parts, wherein a distance between the parallel extension portions is smaller than a height of the parting-blade. Preferably, both of the parallel extension portions are formed with mechanical interlocking structures.

The extension portions could alternatively be called "arms".

The present invention was developed as a coolant conduit configured to be mounted on a parting-blade.

Stated differently, the present invention is a coolant conduit securely mounted on a parting-blade such that the outlet thereof is proximate to the cutting insert to effectively provide coolant thereto.

The coolant conduit can comprise at least one extension portion thinner than the cutting insert cut width and thus a portion of the coolant conduit is configured to enter within the envelope of a narrow slit within the workpiece being parted and towards oncoming chips.

A number of unique safety mechanisms were developed to ensure that chips being machined would not dislodge or damage the coolant conduit.

Such coolant conduit was found to be advantageous of the above-mentioned regular-shaped blade concept with coolant only provided to one side. Additionally, since the coolant conduit does not undergo wear from machining forces (in contrast with parting-blades with internal coolant holes) it can be remounted on many different parting-blades, which are now cheaper and simpler to produce due to them not requiring internal coolant holes. Additionally, it was discovered that unlike the above-mentioned parting-blades with coolant holes which are limited to at most 140 bar pressure, the coolant conduit can be supplied at an inlet thereof with higher coolant pressures (resulting in a greater coolant supply and hence cutting insert tool life is extended even more). Additionally, the parting-blade is stronger than one which has less material (due to the provision of voids, i.e. coolant holes) allowing maximum machining strength. Stated differently, the parting-blade can be devoid of coolant passageways. This is not to say that the coolant conduit cannot be used with a parting-blade having coolant passageways, but that one advantageous embodiment of the parting-blade is devoid of expensive internal coolant passageways, since the coolant conduit provides coolant. Additionally, by elongating the cross section of a coolant passageway in an extended-width cutting plane, additional coolant can be provided through each outlet (compared with a traditionally circular conduit outlet).

Further independently unique aspects developed are listed below.

According to an aspect of the present invention there is provided a method of parting or grooving a slit in a workpiece with a tool assembly comprising: a first step of moving the tool assembly, relatively, towards a workpiece until the workpiece is contacted by a cutting edge of a cutting insert; a second step of moving the tool assembly, relatively, further towards the workpiece such that the cutting insert and a parting-blade on which the cutting insert is mounted machine a slit in the workpiece; wherein during the second step a portion of a coolant conduit enters the slit formed in the workpiece.

According to another aspect of the present invention there is provided a method of securing a coolant conduit to a parting-blade; the method comprising providing a coolant conduit comprising an extension portion formed with a mechanical interlocking structure, comprising: a first step of suspending the coolant conduit on the parting-blade; and a second step of fastening the coolant conduit to the parting-blade with a fastening portion.

According to another aspect of the present invention there is provided a method of securing a coolant conduit to a parting-blade; the method comprising: a first step of inserting the parting-blade through an insertion gap formed in the coolant conduit. Preferably, the insertion gap has an elongated shape.

According to another aspect of the present invention there is provided a coolant conduit with at least one elongated linear-shaped extension portion comprising a mechanical interlocking structure.

By elongated it is meant that that a maximum length LM of the extension portion is greater than a maximum height HE of the extension portion. Stated differently a maximum length to maximum height ratio preferably fulfills the condition: LM>HE.

It will be understood that while a greater maximum height HE allows a larger cross section (in the height direction) and therefore more coolant to be transferred through the extension portion, it requires a larger, less compact construction which can either limit cut depth or impede on the area needed for adjacent tool assemblies. Nonetheless, it has been found that the coolant conduit of the present invention provides ample coolant and hence it is preferred to configure the extension portions to allow the outlets thereof to be as close as possible to the cutting insert. Thus, it is even more preferred that the maximum length to maximum height ratio fulfills the condition: LM>2HE, or even LM>3HE.

For the non-linear shaped extension portion shown in the drawings, the maximum length LM is measurable along the entire length thereof, for example LM=LM2+LM3 as shown in FIG. 6C. Thus it will be understood that the maximum length to maximum height ratio can even fulfill the condition: LM>4HE.

Nonetheless, in order to provide a reasonable amount of coolant, it is still preferred that each linear section (which is identified LM1 and LM3, respectively in FIG. 6C) of an extension portion located adjacent to the insert pocket, have a maximum length to maximum height ratio fulfilling the condition: LM<8HE, or even LM<6HE.

The at least one elongated extension portion can be exactly two extension portions spaced-apart from each other.

The at least one elongated extension portion can extend within an extended-width cutting plane PC.

The at least one elongated extension portion can be two extension portions extending in different directions within an extended-width cutting plane PC.

Alternatively stated, an extension portion can extend in a common plane as the parting-blade.

The coolant conduit can be provided with a coolant passageway comprising an outlet opening out at the extension portion.

The coolant conduit can be provided with a coolant passageway comprising an outlet opening out to the extension portion. An outlet can be formed on a slanted front extension surface. By slanted, it is meant oblique relative to a direction in which the extension portion extends. More precisely, it can be oblique or slanted relative to a direction in which the mechanical interlocking structure extends.

According to any of the aspects, the coolant conduit can preferably be configured with one or more of the following safety features.

An extension portion can comprise a safety projection or safety recess, preferably a safety projection. When mounted, a safety projection preferably is accommodated within a safety recess without contact.

An extension portion can preferably be biased against a parting-blade.

More preferably, the surfaces being biased can each comprise a mechanical interlocking structure.

An extension portion can be thinner than a parting-blade.

An extension portion can be elongated from a inner extension surface to an outer extension surface. This provides further structural strength than a mere cylindrical conduit, noting the unique space restrictions for parting or grooving applications. Stated differently An extension portion can be provided a slanted front extension surface for deflecting oncoming chips.

A front extension surface can be located a safe distance from an insert pocket for avoiding oncoming chips, even though such distance slightly reduces coolant effectiveness.

An extension portion can be coated to be heat or impact resistant.

According to any of the aspects, the parting-blade can preferably be configured with one or more of the following safety features.

A parting-blade's blade sub-edge can comprise a safety projection or safety recess, preferably a safety recess. When mounted, a safety projection preferably is accommodated within a safety recess without contact.

An extension portion can preferably be biased against a parting-blade's blade sub-edge.

A parting-blade's blade sub-edge can comprise a mechanical interlocking structure.

In accordance with another aspect of the present invention there is provided a rigid coolant conduit.

By rigid, it is meant that the coolant conduit has a basic shape unlike a flexible tube or pipe which adapts to the shape of a component it is held by.

Preferably the coolant conduit comprises at least three turns.

The rigid body can preferably be made of metal, preferably steel.

The coolant conduit can be configured for direct connection to a supply pipe. Stated differently, the coolant conduit's inlet can be formed with a female thread.

The coolant conduit can be figured to extend along two non-parallel blade-sub edges.

In accordance with another aspect of the present invention, there is provided a parting-blade comprising: first and second blade sides and a peripheral blade edge connecting the first and second blade sides; and a first insert pocket formed along the peripheral blade edge; the peripheral blade edge comprising: first and second blade sub-edges extending from different sides of the first insert pocket; the first insert pocket comprising: a base jaw; a second jaw; and a slot end connecting the base jaw and the second jaw; the base jaw is closer than the second jaw to the first blade sub-edge; the second jaw is closer than the base jaw to the second blade sub-edge; wherein at least one of the following two conditions is fulfilled: a first condition wherein the second blade sub-edge is longer than the first blade sub-edge; and the first blade sub-edge is formed with a first blade mechanical interlocking structure; and a second condition wherein both the first blade sub-edge and the second blade sub-edge are both formed with a blade mechanical interlocking structure.

Generally speaking, introductory words such as "second" in the term "second mechanical interlocking structure" and similar words such as "first", are to be considered identifying names only and are not meant to define a number of elements present.

Regarding the first condition: it will be understood that another way to state that the second blade sub-edge is longer than the first blade sub-edge is to say that the parting-blade is elongated along the second blade sub-edge. Stated differently, the parting-blade is elongated along the same direction as the base jaw. Hereinafter, such blades will be called x-axis blades.

X-axis blades are only known with a blade mechanical interlocking structure along their elongated side (i.e. along the second blade sub-edge and the sub-edge parallel thereto) which is intended for clamping the parting-blade to a blade holder. Accordingly, x-axis blades are only provided with a flat first blade sub-edge (are therefore devoid a blade mechanical interlocking structure along their first blade sub-edge).

To clarify, for the present invention, the function of a blade mechanical interlocking structure is not primarily for a traditional slanted blade holder jaw (such corresponding element being called a pocket projecting edge in the examples below) but another component as explained below. Thus, for example, a single blade mechanical interlocking structure could be provided to a parting-blade and the remainder (or a part of) the peripheral blade edge could be flat for abutment with a blade holder edge (also called a "pocket projecting edge" below), with one or more screws providing a lateral force on the parting-blade to keep it engaged with a blade holder support surface (also called a blade-pocket side surface below).

However, for parting-blades in which a blade mechanical interlocking structure is provided in any case, it is preferred that the blade mechanical interlocking structure to also provide a function of assisting in providing a lateral force and biasing the parting-blade towards a blade holder support surface.

Regarding the second condition: a less common parting-blade (hereinafter called Y-axis blades) exists in which the first blade sub-edge is longer than the second blade sub-edge (stated differently, elongated perpendicular to the base jaw.). Such Y-axis blades are only known with a blade mechanical interlocking structure along their elongated side (i.e. along the first blade sub-edge and the sub-edge parallel thereto) which is intended for clamping the parting-blade to a blade holder.

Hitherto both elongated X-axis and Y-axis blades are not known with blade mechanical interlocking structures along both sub-edges extending from different sides of an insert pocket. Needless to say, there is an expense involved in providing blade mechanical interlocking structures (which are typically ground), and hence such feature is not known because there has been no need therefore for traditional parting-blades which are clamped on opposing elongated sides of a parting-blade. Such traditional clamping allows the parting-blade overhang length to be beneficially variably changed as per user needs.

It will be understood that non-blade aspects of the present invention could be used with blades of the prior art having only prior art blade mechanical interlocking structures or even only flat peripheral edges. This is because the blade mechanical interlocking structure is one of the optional yet preferred safety features for extension portions used for the present invention. For example, a parting-blade may be used with one of the non-blade aspects and be devoid of a blade mechanical interlocking structure in an embodiment where one or more extension portions have flat extension-abutment surfaces which are biased against corresponding flat peripheral edge abutment surfaces of a parting-blade, and one or more screws are provided to apply a lateral force to the parting-blade.

Nonetheless, for the present aspect in which at least one blade mechanical interlocking structure is provided, the following are preferred features.

The blade mechanical interlocking structure can extend along a majority of the sub-edge.

A forwardmost blade sub-edge can be formed with a blade mechanical interlocking structure (e.g. for x-axis blades, the forwardmost blade sub-edge is the first blade sub-edge; i.e. the blade sub-edge which is not elongated; or in cases of a regular-shaped blade the forwardmost blade sub-edge can be the sub-edge furthermost from a blade holder shank when the blade is mounted to the blade holder). As discussed above, known blades are not provided with blade mechanical interlocking structure at a side thereof that is not used for clamping to a blade holder.

Both the sub-edges extending from different sides of an insert pocket can be formed with a blade mechanical interlocking structure. As discussed above, known blades are not provided with blade mechanical interlocking structure at a side thereof that is not used for clamping to a blade holder.

The blade mechanical interlocking structure can be any mechanical structure which can apply a lateral force. Stated differently, the blade mechanical interlocking structure can be any mechanical structure other than a flat surface. More specifically, the blade mechanical interlocking structure comprises at least one blade sub-edge projection. More precisely, in a direction perpendicular to a thickness dimension there is at least one blade sub-edge projection. Some non-limiting, yet preferred examples of the at least one blade sub-edge projection are a single, central, blade sub-edge projection; or two or more blade sub-edge projections separated by a blade sub-edge recess located therebetween; a single non-central blade sub-edge projection; or more than one non-central blade sub-edge projections, located at different distances from an insert pocket. In each of the examples, there is an apex and at least one blade sub-edge abutment surfaces extending from the apex to one of the first and second blade sides. The blade sub-edge abutment surfaces can be convexly or concavely curved, yet are most preferably flat-slanted surfaces which allows precision grinding. To elaborate with respect to the most preferred embodiment there is a single, central, blade sub-edge projection (corresponding to a typical v-shaped cross section commonly used for longitudinal edges of parting-blades). This is because it provides equal lateral support to both sideways directions. More precisely, the single, central, blade sub-edge projection has an apex and has first and second blade sub-edge abutment surfaces extending from the apex to the first and second blade sides. Preferably, the first and second blade sub-edge abutment surfaces are flat-slanted surfaces which allows precision grinding. However, they could be convexly or concavely curved. A preferred internal blade angle $\alpha$ for the single, central, blade sub-edge projection fulfilling the condition: $120°\leq\alpha\leq170°$, more preferably $140°\leq\alpha\leq160°$, with values of $\alpha$. While a typical internal blade angle $\alpha$ for a blade mechanical interlocking structure for a known x-axis blade is $150°$, which is believed optimal for clamping, it may be that slightly smaller angles, e.g. $120°\leq\alpha\leq148°$, or $135°\leq\alpha\leq145°$ are preferred for the blade mechanical interlocking structure of the present invention or at least a portion of the blade mechanical interlocking structure adjacent to an insert pocket, and/or for at least for a forwardmost blade sub-edge. This is in particular, beneficial for cases where the blade mechanical interlocking structure or portion thereof with such angle, is not used for clamping the parting-blade but is used for abutment with an extension-abutment surface. Notably, it is difficult to retain interlocking contact of a thin extension portion and a parting-blade, thus a more aggressive angle (i.e. the smaller angle ranges stated above) may be preferred. Nonetheless, in the shown prototype examples, the standard angle of $150°$ was found to work well. Preferably, the first and second blade sub-edge abutment surfaces extend at equal internal angles from the apex to the first and second blade sides. This allows the same blade to be used for similar effect for both right and left hand blade holders.

The blade mechanical interlocking structures of the parting-blade can have the same cross section. While a variable cross-section is possible, a uniform cross section allows for ease of production.

In accordance with another aspect of the present invention, there is provided a parting-blade comprising: first and second blade sides and a peripheral blade edge connecting the first and second blade sides; and a first insert pocket formed along the peripheral blade edge; the peripheral blade edge comprising: first and second blade sub-edges extending from different sides of the first insert pocket; wherein: at least one of the first blade sub-edge and the second blade sub-edge is formed with a blade safety recess.

Preferably, the first insert pocket comprises: a base jaw; a second jaw; and a slot end connecting the base jaw and the second jaw; the base jaw is closer than the second jaw to the first blade sub-edge; the second jaw is closer than the base jaw to the second blade sub-edge; wherein: the blade safety recess is formed on the second blade sub-edge.

Preferably, there is a blade safety recess formed on each of the first and second blade sub-edges.

Preferably, there is a blade safety recess formed on each of the first and second blade sub-edges.

Preferably, the blade safety recesses adjacent a common insert pocket are equally spaced therefrom.

The blade safety recess is a feature which allows an extension safety projection to extend into the blade's sub-edge to prevent oncoming chips from becoming wedged between the extension portion and blade, thereby displacing the extension portion.

The blade safety recess is most preferred for the second blade sub-edge (associated with the rake surface of a cutting insert mounted to the parting-blade, since the first blade sub-edge is adjacent the base jaw).

However, the blade safety recess can also be preferred for the first blade sub-edge for functions other than to prevent oncoming chips from being wedged as described above, such as providing a visual indicator for a user that the extension portion is correctly mounted to the thin blade. Stated differently, if a user observes the parting-blade from the side and the extension safety projection is located within the blade safety recess, it can be assumed the extension portion is correctly mounted.

It will be understood that non-blade aspects of the present invention could be used with blades of the prior art devoid of a blade safety recess. This is because the blade safety recess is one of the optional yet preferred safety features for extension portions used for the present invention.

Nonetheless, for the present aspect in which at least one blade safety recess is provided, the following are preferred features:

a. The blade safety recess can preferably be provided on the blade sub-edge adjacent the second blade sub-edge, for the reason described above.

b. The blade safety recess can preferably be first and second blade safety recesses, respectively provided on both the first and second sub-edges.

c. Where there is more than one blade safety recess on a single sub-edge, they can be located at equal distances from a sub-edge center. Stated differently, they can be symmetrically located along the sub-edge. Alternatively defined, the blade safety recesses adjacent a common insert pocket are equally spaced therefrom. Stated differently, the blade safety recess can preferably be within a recess length LR measured from the sub-edge at the insert pocket to the blade safety recess, fulfilling the condition: $LR\leq30$ mm, preferably $LR\leq20$ mm, most preferably $LR\leq15$ mm. While the closer the blade safety recess and consequently the extension portion is to a cutting insert, the more effective the coolant will be, there is still a limitation of how close it can be located due to the danger of being impacted by chips or the workpiece (at the relief side). Accordingly, it is preferred that $LR\geq4$ mm, preferably $LR\geq8$ mm.

d. The blade safety recess can be located adjacent to the insert pocket. Stated differently, the blade safety recess can be located between an insert pocket and a sub-edge center.

In accordance with any parting-blade aspect or aspect comprising a blade, the following are preferred features:

a. The parting-blade can be an elongated blade.

b. The parting-blade can be a solid parting-blade. By "solid" it is meant that the parting-blade is devoid of internal coolant channels. It will be understood that this allows a greatly simpler manufacturing process. However, it is feasible that a parting-blade may have a coolant channel to one side of an insert pocket (if it is difficult to provide an extension along that side of the parting-blade). In such case a blade assembly may have, for example, one extension providing coolant to one side of an insert pocket and an internal coolant channel providing coolant to the other side of the insert pocket (or to the cutting insert, e.g. through a hole in the cutting insert). In such case the internal coolant channel is preferably a straight through hole. At least in the case of a straight through hole a manufacturing process is at least simplified over known prior art with internal coolant channels since no plugging step is needed.

c. At least a portion of the parting-blade (adjacent to each insert pocket) is an elongated portion. A cutting insert configured to be mounted to the insert pocket having a cut width CW wider than a thickness dimension of the blade along the elongated portion, thereby allowing the elongated portion to enter a part of a workpiece being parted.

d. Each blade has a plurality of insert pockets. It will be understood that for each additional insert pocket the parting-blade is more economically efficient. However, it is most preferred for the parting-blade to have two to five insert pockets, more preferably, three or four insert pockets. It will be understood that for parting operations the chips involved need significantly more chip evacuation area than more circular slitting blades which can accommodate more than five insert pockets. Preferably, a parting-blade has an insert pocket formed at each corner thereof.

e. A blade can be devoid of screw holes. According to some preferred embodiments the parting-blade has a single central manufacturing hole. The central manufacturing hole allows the parting-blade to be rotated for the blade mechanical interlocking structures to be produced in a single mounted operation. Regardless, a blade can be devoid of threaded holes.

f. While the second jaw can feasibly be of the type located above the base jaw, as is typical for many insert pockets, it preferably is located rearward of the base jaw and extends oblique (basically perpendicular) thereto. This is because a second jaw which extends over the base jaw makes it more difficult for an extension to be aimed towards a cutting insert's cutting edge (requiring a steeper angle and thus the extension requires a greater height from the parting-blade). This consideration is only for an extension extending along a rake side of a parting-blade's sub-edge. Nonetheless, it should be clear that each type of known insert pocket is feasible with the present invention.

g. While each type of known insert pocket is feasible with the present invention, it is preferred for the parting-blade to have a resilient insert pocket (i.e. one which does not have a screw or lever to secure the screw). This is because parting operations are preferred to be carried out with a smaller cut width which wastes less material. It will be understood that the present invention, although most beneficial for parting, is also suitable for grooving and particular large depth grooving, without the final step of parting the workpiece.

h. Preferably the parting-blade's thickness dimension DT fulfils the condition: 0.8 mm≤DT≤4 mm, more preferably 1.2 mm≤DT≤3 mm and most preferably 1.4 mm≤DT≤2.5 mm. Regarding the lower end of the range (i.e. 0.8 mm) it will be understood that for coolant provision, integrally formed holes on blade holders can still provide effective coolant over small distances (e.g. 10-20 mm). Thus a significant advantage of a coolant extension is when it is more than 20 mm long. However, there are cut depth/overhang limitations to how strong a thin parting-blade can be, thus it is not believed that a very long cut depth can be provided with less than 0.8 mm thickness. Additionally, noting that an extension portion preferably has an extension thickness TE less than the blade's thickness dimension DT (to provide relief) the amount of coolant provided at less than 0.8 mm would provide only a small effect. Regarding the upper end of the range, it is noted above that to reduce material wastage a blade's thickness dimension as small as possible is preferred. However, it is understood that a minimum thickness is still related to cut depth required.

i. For similar considerations to those mentioned regarding the parting-blade's thickness dimension DT, preferably a regular-shaped parting-blade has a sub-edge length LS fulfilling the condition: 30 mm≤LS≤80 mm, more preferably 40 mm≤LS≤70 mm and most preferably 45 mm≤LS≤60 mm. An alternative way to define the par regular-shaped parting-blade's size is by a circumscribing circle CC which contacts the peripheral blade edge. The circumscribing circle CC preferably fulfils the condition: 40 mm≤CC≤80 mm, more preferably 45 mm≤CC≤70 mm and most preferably 50 mm≤CC≤65 mm.

j. Regarding an elongated parting-blade has a sub-edge length LS along the smaller sub-edge (i.e. the sub-edge adjacent the base jaw for x-axis blades, and adjacent the second jaw for y-axis blades) fulfils the condition: 10 mm≤LS≤40 mm, more preferably 15 mm≤LS≤36 mm and most preferably 24 mm≤LS≤34 mm.

k. For similar considerations to those mentioned regarding the parting-blade's thickness dimension DT, preferably a cutting insert's cut width CW fulfils the condition: 1.0 mm≤CW≤5 mm, more preferably 1.4 mm≤CW≤4 mm and most preferably 1.6 mm≤DT≤3.2 mm.

l. For similar considerations to those mentioned regarding the parting-blade's size, preferably a parting assembly's depth of cut CD fulfils the condition: 40 mm≤CD≤160 mm, more preferably 50 mm≤CD≤140 mm and most preferably 60 mm≤CD≤125 mm.

It will be understood that for parting-blades formed within internal holes, additional material needs to be provided, at least at a rake side thereof to allow the hole to be directed towards a cutting edge. This means that on each side of an indexable parting-blade material is added increasing the size of the parting-blade. Thus the hole-free parting-blades of the present invention (but still providing high-pressure coolant adjacent to insert pockets) are smaller and therefore the blades themselves are structurally stronger (more able to resist bending).

Additionally, a parting-blade free of voids (i.e. coolant holes) is structurally stronger than a solid parting-blade.

It will be understood from the disclosure below that the coolant conduit can be devoid of an extension portion. The coolant conduit can comprise a single extension portion. The coolant conduit can comprise two extension portions extending in different directions to each other. The different directions can be a quarter turn.

It is also feasible for a tool assembly to comprising a first extension portion and a second extension portion not connected to each other. In other words an assembly can comprise two coolant conduits according to the present invention, each comprising an extension portion.

It is also feasible for a tool assembly to comprise a coolant conduit according to the present invention, and a parting-blade with at least one internal coolant hole extending therethrough.

Regarding the shape of the coolant conduit:

It is preferred that at least an inner body surface (i.e. a forwardmost surface) is arc-shaped.

Regarding the shape of an extension portion:

It is preferred that an extension portion, or at least a part thereof comprising an outlet, has a linear-shape. By linear or linear-shape, it is meant that when the coolant conduit is viewed in a side view, for example that shown in FIG. 6C, it extends in a straight line, even though the cross section thereof may vary.

Preferably the extension portion lies only in an extended-width cutting plane PC.

Preferably, the extension portion has an elongated extension cross section perpendicular to an elongation direction of the extension portion. Stated differently, preferably the elongated extension cross section is elongated in a direction from an inner extension surface to an outer extension surface.

Preferably the extension portion comprises a bend. The bend can be approximately a quarter turn. This is particularly beneficial for an extension portion configured to abut a relief side of a parting-blade. Nonetheless, adjacent to an outlet it is preferred that the extension portion comprise a linear-shape.

Regarding the coolant passageway shape:

Preferably, the coolant passageway in the extension portion, perpendicular to an elongation direction of the extension portion, has an elongated passageway cross section. Stated differently, preferably the elongated passageway cross section is elongated in a direction from an inner extension surface to an outer extension surface.

Preferably an extension sub-passageway has a linear-shape.

Preferably, a coolant passageway, from the inlet, splits (or forks) in two different directions.

The two directions can be opposite to each other.

According to another aspect of the present invention, there is provided a tool assembly comprising a parting-blade and a coolant conduit; the coolant conduit is fastened to the parting-blade; the parting-blade being formed with a first and second blade sub-edges extending from different sides of the first insert pocket; at least one of the first blade sub-edge and the second blade sub-edge is formed with a blade safety recess; the coolant conduit comprises an extension portion formed with an extension safety projection; and wherein the extension safety projection is at least partially within the blade safety recess.

Preferably, there is a gap separating the blade safety recess and the extension safety portion.

According to another aspect of the present invention, there is provided a coolant conduit comprising: a body portion comprising a first body end, a second body end and an intermediary portion connecting the first end and second end; a first extension portion extending from the first body end; and the entire first extension portion is formed with a mechanical interlocking structure.

According to another aspect of the present invention, there is provided a coolant conduit comprising: a body portion comprising a first body end, a second body end and an intermediary portion connecting the first end and second end; a first extension portion extending from the first body end; and an extension safety projection extends from the inner extension surface adjacent the front extension surface.

According to another aspect of the present invention, there is provided a tool assembly comprising a parting-blade and a coolant conduit; the coolant conduit is fastened to the parting-blade; the coolant conduit being formed with a first extension portion extending in a common plane with the parting-blade.

According to another aspect of the present invention, there is provided a coolant conduit comprising: a body portion comprising a first body end, a second body end and an intermediary body sub-portion connecting the first end and second end; and a coolant passageway; the coolant passageway comprising: an inlet; a first outlet; and an intermediary passageway extending from the inlet to the first outlet. Preferably, the coolant passageway comprises at least two turns, more preferably three turns. Preferably, at least one of the turns is smoothly curved. More preferably, all of the turns are all smoothly curved.

It will be understood that the aspects above may comprise any one of or combination of the sub-features described above.

Generally speaking, all element names hereinafter using numbering (e.g. "first") are to be considered identifying names only and are not meant to define a number of elements present in the claims. For example, if a claim has an element the name of which includes "first" this does not imply that a "second" such element is required for the claim, rather that this is just a name. Similarly, the word "upper" or the like, is only to provide a definition relative to other elements of the same component and does not define the overall orientation of the component itself.

Where it is stated that a coolant conduit is "fastened" to a parting-blade, this also includes the case of a pressure-fit.

As is well known in the art, a rake surface is the surface above which machined chips are intended to flow and a clearance surface is typically designed to be receded from a cutting edge.

BRIEF DESCRIPTION OF THE DRAWINGS

For a better understanding of the subject matter of the present application, and to show how the same may be carried out in practice, reference will now be made to the accompanying drawings, in which:

FIG. 7A is a side view of a portion of the tool assembly in FIG. 1, parting a cylindrical workpiece which is schematically shown by a dashed line;

FIG. 7B is a front view of the tool assembly in FIG. 7A, schematically parting the workpiece;

FIG. 7C is a partial top view of the tool assembly in FIG. 7A, schematically parting the workpiece;

FIG. 7D is a bottom view of the tool assembly in FIG. 7A, schematically parting the workpiece;

FIG. 8A is a top view of a second embodiment of a coolant conduit according to the present invention;

FIG. 8B is a front view of the coolant conduit in FIG. 8A, with a coolant passageway being shown schematically with dashed lines;

FIG. 8C is a side view of the coolant conduit in FIG. 8A, with a coolant passageway being shown schematically with dashed lines;

FIG. 8D is a rear view of the coolant conduit in FIG. 8A;

FIG. 8E is a bottom view of the coolant conduit in FIG. 8A;

FIG. 9A is a perspective view of a fastening element of the coolant conduit in FIG. 8A;

FIG. 9B is a different perspective view of the fastening element in FIG. 9A;

FIG. 10A is a first end view of the fastening element in FIG. 9A;

FIG. 10B is a side view of the fastening element in FIG. 10A, in a fastening orientation;

FIG. 10C is a section view along the line XC-XC in FIG. 10B;

FIG. 10D is a second end view of the fastening element in an opposite direction to FIG. 10A;

FIG. 10E is a side view of the fastening element in FIG. 10A, in a different fastening orientation to FIG. 10B, namely rotated about a quarter turn relative thereto;

FIG. 10F is a section view along the line XF-XF in FIG. 10E;

FIG. 12A is a side perspective view of another coolant conduit according to the present invention;

FIG. 14A is a front view of a fifth embodiment of a coolant conduit according to the present invention;

FIG. 14B is a side view of the coolant conduit in FIG. 14A, further schematically showing a workpiece with a circular dashed-line, and a portion of a larger workpiece schematically shown with a dashed arc;

FIG. 15A is a front view of a sixth embodiment of a coolant conduit according to the present invention;

FIG. 15B is a side view of the coolant conduit in FIG. 15A, further schematically showing a workpiece with a circular dashed-line, and a portion of a larger workpiece schematically shown with a dashed arc;

DETAILED DESCRIPTION

Figures 1, 2A, 2B, 2C:
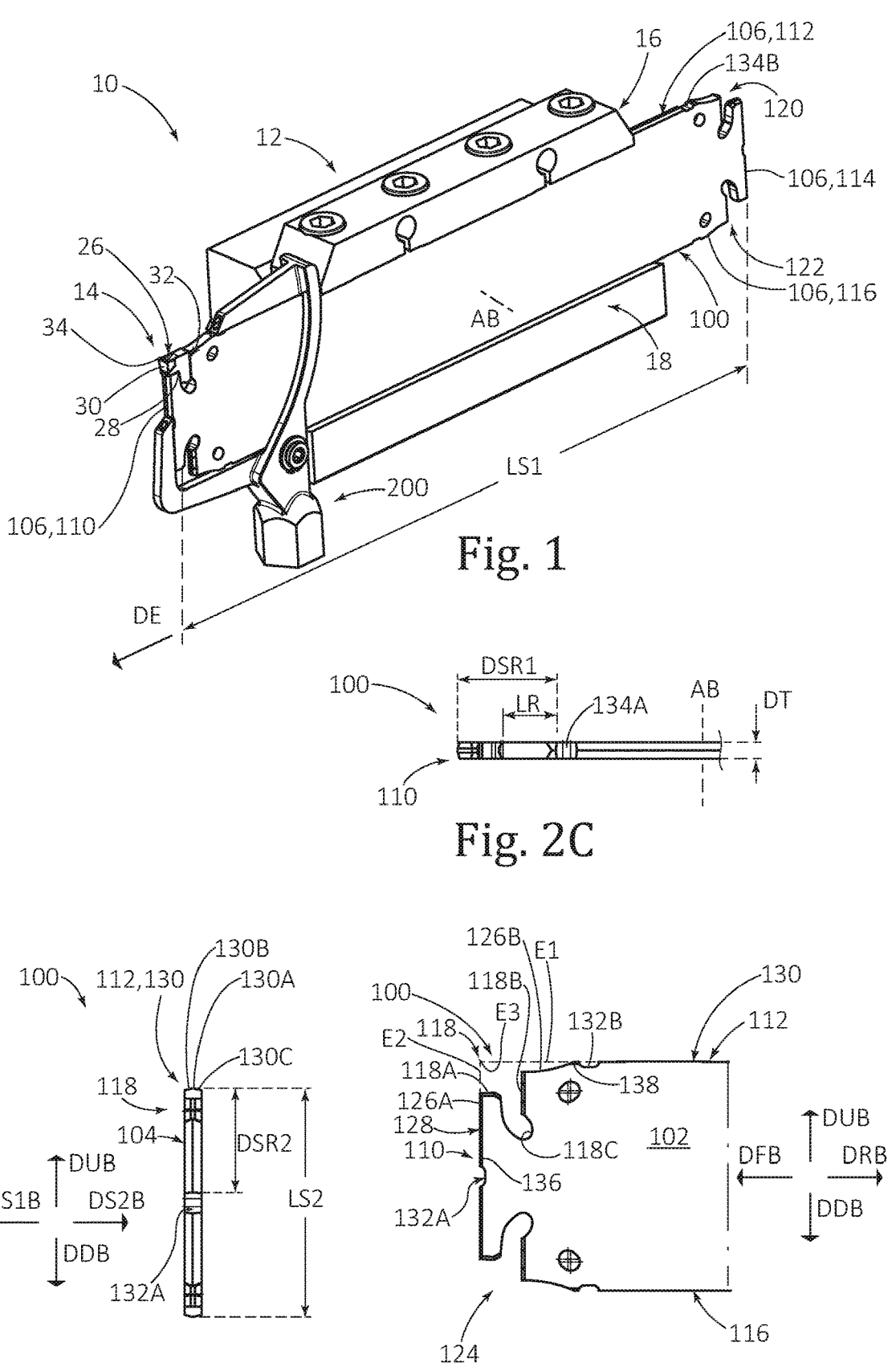
FIG. 1 is a perspective side view of a tool assembly according to the present invention.
FIG. 2A is a side view of a part of a parting-blade of the tool assembly in FIG. 1.
FIG. 2B is an end view of the part of the parting-blade in FIG. 2A.
FIG. 2C is a top end view of the parting-blade in FIG. 2A.

Referring to FIG. 1, there is illustrated an example tool assembly 10 comprising a standard blade holder 12, parting-blade 100 (with a cutting insert 14 mounted thereto) and a coolant conduit 200 fastened to the parting-blade 100.

As will be elaborated below, the coolant conduit 200 is configured to be directly attached to a supply hose (not shown), and therefore there is no need for extra elements common in the field, such as plugs, o-rings, threaded holes in the holder 12 and parting-blade, etc.

The blade holder 12 shown is of a simple type having no coolant arrangement. Having said that, if a user has a blade holder configured for coolant transfer, it can be used to hold the parting-blade 100 for a parting operation, albeit the coolant supply pipe will still be connected to the coolant conduit 200.

Figures 2D, 2E, 2G, 2H:
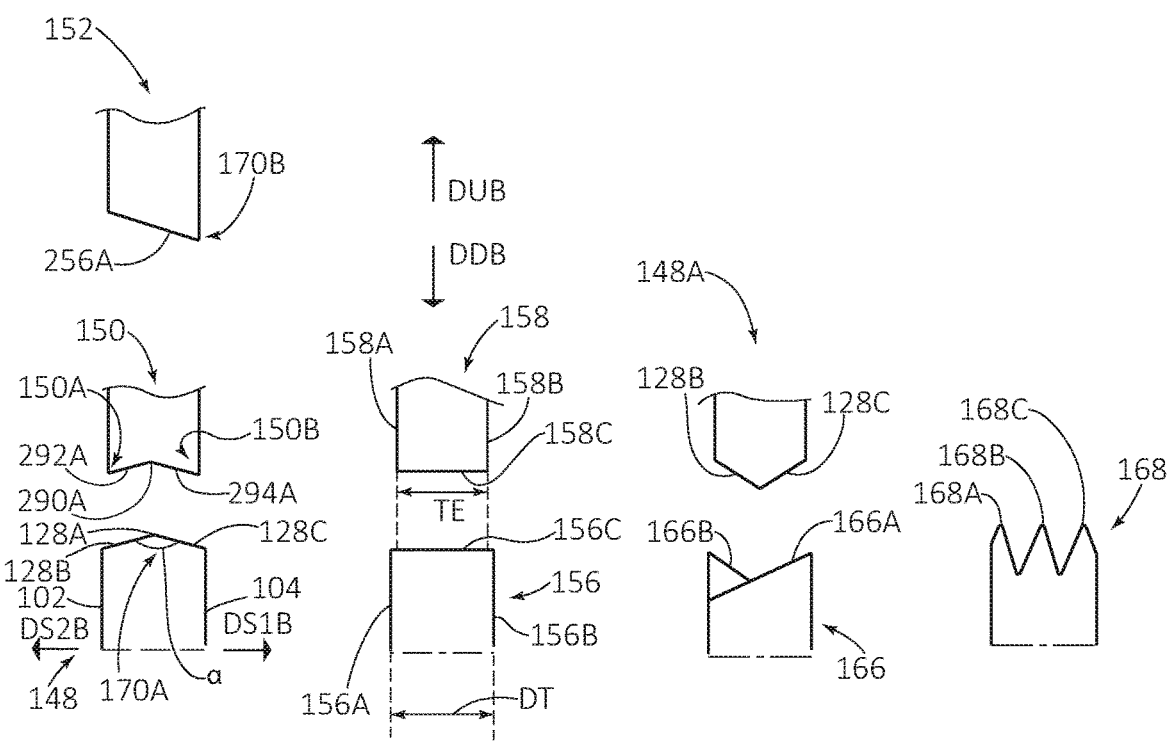
FIG. 2D is a schematic representation of possible mechanical interlocking structures.
FIG. 2E is a schematic representation of structures devoid of a mechanical interlock.
FIG. 2G is a schematic representation of possible mechanical interlocking structures.
FIG. 2H is a schematic representation of possible mechanical interlocking structures.

While the present invention can be used with any parting-blade which extends from a blade holder, typically blade holders used have upper and lower jaws 16, 18, each formed with a tapered edge (not shown; corresponding in cross section to the mechanical interlocking structure 152 in FIG. 2D).

The cutting insert 14 comprises: a rake surface 26 and an opposing insert base surface 28, a forwardmost clearance surface 30 extending downwardly (as well as slightly inwardly) from the rake surface 26 towards the base surface 28 and an opposing insert rear surface 32, a forwardmost cutting edge 34 formed at an intersection of the rake surface 26 and the forwardmost clearance surface 30. Typically, the rake surface 26 comprises a chip forming arrangement as shown.

Referring to FIGS. 2A to 2C, the parting-blade 100 will be described.

The parting-blade 100 comprises parallel first and second blade sides 102, 104 and a peripheral blade edge 106 connecting the first and second blade sides 102, 104.

In the given example, the entire parting-blade 100 has a uniform thickness, measured with a thickness dimension DT parallel to a transverse blade axis AB extending through the center of the first and second blade sides. It will be understood that it is feasible to use known parting-blades which have a smaller thickness dimension proximate to an insert pocket and a larger thickness dimension (i.e. a reinforced portion) distal to said insert pocket. However, the present invention discusses the thinner portion of such blades (since that is the portion that enters a workpiece) or completely "planar-shaped" or "plate-shaped" parting-blades with a uniform thickness.

It is also noted that the coolant conduit 200 and consequently the tool assembly 10 comprising same, in addition to providing coolant, provides an anti-vibration effect. Thus parting-blades with such coolant conduits fastened thereto are more stable than without the coolant conduit, due to the latter's weight and mounting location. More specifically, any additional weight (and preferably more weight is thought to produce, in theory, better results) and a position closer to the cutting edge is thought to be preferred.

The peripheral blade edge 106 comprises first, second, third and fourth blade sub-edges 110, 112, 114, 116.

In the given example, the blade is elongated in a direction parallel to the second and fourth blade sub-edges 112, 116, said elongation defining an elongation direction DE and a first sub-edge length LS1 measurable parallel to said second and fourth blade sub-edges 112, 116 and in an orthogonal direction to the transverse blade axis AB. A second sub-edge length LS2 is measurable parallel to said first and third blade sub-edges 110, 114 and in an orthogonal direction to the transverse blade axis AB. It will be understood that while a typical parting-blade shape is being exemplified, a coolant conduit of the present invention can be shaped to be fastened on other shaped parting-blades.

The exemplified parting-blade is optionally yet preferably an indexable parting-blade (i.e. comprising more than one insert pocket; i.e. first, second, third and fourth identical insert pockets 118, 120, 122, 124 formed along the peripheral blade edge 106). It will be understood that this is a unique parting-blade, and most known parting-blades have at most two insert pockets. Nonetheless, the coolant conduit 200 is suitable for a parting-blade with any number of insert pockets.

The first insert pocket 118 of the identical insert pockets will be exemplified below for explanation.

It is shown that the first insert pocket comprises a base jaw 118A, a second jaw 118B, and a slot end 118C connecting the base jaw 118A and the second jaw 118B.

Along the peripheral blade edge 106, adjacent to the base jaw 118A there is an external pocket relief surface (also called a "relief side") 126A, and adjacent to the second jaw 118B there is an external pocket rake surface 126B (also called a "rake side").

Using the first insert pocket 118 as an arbitrary reference, directions can be defined as follows.

A blade forward direction DFB extends from the third blade sub-edge 114 towards the first blade sub-edge 110, a blade rearward direction DRB opposite to the blade forward direction DFB, a blade upward direction DUB extending perpendicular to the blade forward direction and from the fourth blade sub-edge 116 towards the second blade sub-edge 112, a blade downward direction DDB opposite to the blade upward direction DUB, a blade first side direction DS1B extending perpendicular to the blade forward direction DFB and from the first blade side 102 towards the second blade side 104, and a blade second side direction DS2B opposite to the blade first side direction DS1B.

The blade forward direction DFB constitutes a feed direction in which direction the tool assembly 10 is moved relative to a workpiece for a parting operation. As will be explained below, the directions defined here for the parting-blade will correspond to the directions defined below for the holder 12 when the tool assembly 10 is assembled.

Notably, the first and second blade sub-edges 110, 112 extend from different sides of the first insert pocket 118. More specifically, the first blade sub-edge 110 extends in the blade downward direction DDB from the first insert pocket 118 and the second blade sub-edge 112 extends in the blade rearward direction DRB from the first insert pocket 118.

The first blade sub-edge 110 is formed with a first blade mechanical interlocking structure 128. It will be understood that when the cutting insert 14 is mounted to the first insert pocket 118, the machining direction is the blade forward direction DFB and hence the first blade sub-edge 110 is a so-called forwardmost blade sub-edge.

The preferred first blade mechanical interlocking structure 128 is a convex, v-shaped, cross section commonly used for longitudinal edges of parting-blades. More precisely, the first blade mechanical interlocking structure 128 comprises a central apex 128A and first and second blade sub-edge abutment surfaces 128B, 128C extending from the apex, at an internal blade angle α as seen in FIG. 2D, to the first and second blade sides 102, 104.

The second blade sub-edge 112 is formed with a second blade mechanical interlocking structure 130 identical in cross-section to the first blade mechanical interlocking structure 128 described above. More precisely, the second blade mechanical interlocking structure 130 comprises a central apex 130A and first and second blade sub-edge abutment surfaces 130B, 130C extending from the apex to the first and second blade sides 102, 104.

The first blade sub-edge 110 is formed with a first blade safety recess 132A. In this example, the first blade safety recess 132A is located at the center of the first blade sub-edge 110 between the first insert pocket 118 and the fourth insert pocket 124. It will be understood that the word "first" is just a name for identifying purposes, and that, as shown, there is no second safety recess of the first blade sub-edge 110, at least in the given example. If needed for clarity, the first blade safety recess 132A could, for example, be alternatively called a "front blade safety recess".

As shown in FIG. 2A, the first blade safety recess 132A extends more in the rearward direction DRB than a rearwardmost point 136 of the first blade sub-edge 110 located between the first insert pocket 118 and the first blade safety recess 132A.

The second blade sub-edge 112 is formed with a second blade safety recess 132B adjacent the first insert pocket 118. Similarly, it will be understood that the word "second" is just a name for identifying purposes, as further explained above. If needed for clarity, the second blade safety recess 132B could, for example, be alternatively called a "forward blade safety recess".

Further, it will be understood that in embodiments which include a safety recess there can be a single safety recess located at either side of an insert pocket. In the present example there are two safety recesses (i.e. the first blade safety recess 132A and the second blade safety recess 132B), i.e. one safety recess on each side of the first insert pocket 118.

Furthermore, in the present example the second blade sub-edge 112 is formed with an additional second blade safety recess 132B (which could be called a "rear blade safety recess"), adjacent the second insert pocket 120.

As shown in FIG. 2A, the second blade safety recess 132B extends more in the downward direction DDB than a forwardmost point 138 of the second blade sub-edge 112 located between the first insert pocket 118 and the additional second blade safety recess 132B.

Thus, when an oncoming chip comes towards the coolant conduit 200, it cannot become jammed between an extension safety projection extending into a safety recess because the sub-edge above which it passes is higher than the start of the extension portion in the safety recess.

It will be understood that the first blade safety recess 132A of the first blade sub-edge 110 and the second blade safety recess 132B of the second blade sub-edge are the only blade safety recesses functionally related to the first insert pocket. To elaborate, for example, the additional second blade safety recess 134B of the second blade sub-edge 112 will be used when a cutting insert is mounted to the second insert pocket 120, etc. (at least with the coolant conduit 200 exemplified).

More precisely, while the first blade mechanical interlocking structure 128 is considered to extend along the entire first sub-edge 110 (i.e. the majority thereof excluding small interruptions as discussed below), theoretically, the first blade mechanical interlocking structure 128 could only comprise of a small first blade mechanical interlocking structure 128. One reason for provision of the first entire sub-edge 110 with such feature is for the opposing insert pocket, i.e. namely when the fourth insert pocket 124 is in use. Regarding the second blade mechanical interlocking structure 130, it is simultaneously used for clamping by the holder 12. Yet another reason is for ease of production. In any case, it is feasible that a mechanical interlocking structure extend only adjacent or proximate to the associated insert pocket.

Thus, the first blade mechanical interlocking structure 128 extends along a majority of the first sub-edge 110 (i.e. excluding the first blade safety recess).

Regarding the position of the second blade safety recess 132B of the second blade sub-edge 112: the second blade safety recess 132B is located in the area of oncoming chips. The front of the coolant conduit 200 does not extend forward of the second blade safety recess 132B the positions of both are interrelated. To ensure a safe distance of the portion of the coolant conduit adjacent to the second blade sub-edge 112 from oncoming chips, a front extension surface 274A (FIG. 3C) of the coolant conduit 200 preferably is somewhat distanced from the cutting insert. However, it should still be as close as possible, since this improves provision of coolant (with increasing proximity there is greater effectiveness). Therefore, the second blade safety recess 132B position is associated with a forwardmost point of the front extension surface 274A, the position of the second blade safety recess 132B also relates, or defines, the position of the front extension surface 274A. Thus, a recess length LR (FIG. 2C) is measured from the associated sub-edge. More specifically the recess length LR is defined from the first insert pocket 118 to the second blade safety recess 132B.

To provide for optimum coolant, the blade safety recesses are preferably closely and roughly equally distanced from an insert pocket. More precisely, extension lines E1, E2 (FIG. 2A) from adjacent blade sub-edges can meet at an extension line intersection E3, defining approximately equal safety recess distances DSR1, DSR2.

Figure 2F:
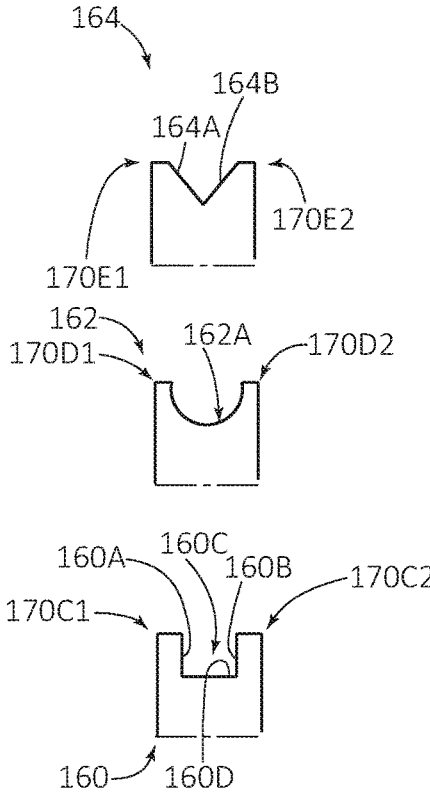
FIG. 2F is a schematic representation of possible mechanical interlocking structures.

Referring to FIGS. 2D to 2F, an explanation of the term "mechanical interlocking structure" (which similarly applies to both blade mechanical locking structures and extension mechanical locking structures of the present invention) will be elaborated with schematic examples.

A mechanical interlocking structure (hereinafter "mechanical structure" or "structure" for conciseness) can be any mechanical structure, excluding friction alone, which can obstruct a lateral force applied to the component comprising the structure.

The blade's mechanical interlocking structure and the extension's mechanical interlocking structure having complementary formations or geometries. It should be understood that a mechanical interlocking structure could alternatively be called a mechanical interlocking formation.

In FIG. 2D, a first interlocking structure 148 is shown. The first interlocking structure 148 corresponds to the interlocking structure of the first blade mechanical interlocking structure 128 exemplified and described above.

A second interlocking structure 150 is shown above the first interlocking structure 148 and is configured for mating therewith (i.e. complementary). The second interlocking structure 150 corresponds to the extension mechanical interlocking structure 280A of the first extension portion 208, exemplified and described below.

To reiterate, the first interlocking structure 148 comprises a central apex 128A and first and second blade sub-edge abutment surfaces 128B, 128C extending from the apex, at an internal blade angle α, to the first and second blade sides 102, 104.

The second interlocking structure 150 comprises a central nadir 290A and first and second extension sub-edge abutment surfaces 292A, 294A extending from the nadir 290A.

It will be understood that while the first and second blade sub-edge abutment surfaces 128B, 128C and the first and second extension sub-edge abutment surfaces 292A, 294A are preferably planar, they could also be curved. For example, the first and second extension sub-edge abutment surfaces 292A, 294A could be convexly curved and the first and second blade sub-edge abutment surfaces 128B, 128C could be planar, or any other combination.

When the first interlocking structure 148 is biased against the second interlocking structure 150 lateral movement in the blade first and second sideward directions DS1B, DS2B (the directions used have been made in reference to the parting-blade but could be equally applicable to the coolant conduit directions defined below) is impeded by not only friction but a mechanical obstruction (i.e. two projections obstructing each other).

To elaborate, the first blade sub-edge abutment surface 128B abuts the first extension sub-edge abutment surface 292A, and the second blade sub-edge abutment surface 128C abuts the second extension sub-edge abutment surface 294A. Preferably the apex 128A and central nadir 290A are configured to be receded from each other so that they do not contact (i.e. a gap being left therebetween) to ensure abutment of said abutment surfaces.

If a sideways force is applied on the first interlocking structure 148 in the blade second sideward direction DS2B, said biasing of the first blade sub-edge abutment surface 128B against the first extension sub-edge abutment surface 292A (i.e. two mechanical or geometric projections engaging each other) obstructs relative movement of the first interlocking structure 148 to, or disengagement from, the second interlocking structure 150.

Similarly, if a sideways force is applied on the second interlocking structure 150 in the blade first sideward direction DS1B, the biasing of the first blade sub-edge abutment surface 128B against the first extension sub-edge abutment surface 292A obstructs relative movement or disengagement of the first interlocking structure 148 and the second interlocking structure 150.

Similarly, if a sideways force is applied on the first interlocking structure 148 in the blade first sideward direction DS1B, said biasing of the second blade sub-edge abutment surface 128C against the second extension sub-edge abutment surface 294A obstructs relative movement or disengagement of the first interlocking structure 148 and the second interlocking structure 150.

Similarly, if a sideways force is applied on the second interlocking structure 150 in the blade second sideward direction DS2B, said biasing of the second blade sub-edge abutment surface 128C against the second extension sub-edge abutment surface 294A obstructs relative movement or disengagement of the first interlocking structure 148 and the second interlocking structure 150.

A third interlocking structure 152 with a mechanical interlocking structure is shown. The third interlocking structure 152, or more precisely the abutment surface 256A thereof, corresponds to a tapered edge of either one of the upper and lower jaws 16, 18 of the holder 12.

When the third interlocking structure 152 is biased against the first interlocking structure 148, the only abutment is between the abutment surface 256A and the second blade sub-edge abutment surface 128C.

From the third interlocking structure 152, it will first be appreciated that interlocking structures do not need to have only mirror image structures.

In the example given, this is sufficient, since there is only mechanical obstruction in one side direction (which is sufficient for the embodiment below since the holder 12 provides a mechanical obstruction to the parting-blade 100 in the other direction).

It will be understood that a blade mechanical interlocking structure is a safety feature introduced to prevent lateral movement of the abutment surfaces which abut the parting-blade. To elaborate, it is feasible that a parting-blade or coolant conduit according to the present invention can be devoid of a mechanical interlocking structure.

For example, in FIG. 2E there is shown: a fourth interlocking structure 156 comprising parallel first and second sidewalls 156A, 156B and an abutment surface 156C perpendicular to the first and second sidewalls 156A, 156B; and a fifth interlocking structure 158 comprising parallel first and second sidewalls 158A, 158B and an abutment surface 158C perpendicular to the first and second sidewalls 158A, 158B.

When the abutment surfaces 156C, 158C are biased against each other there will not be any mechanical obstruction (or geometric projection) to prevent relative movement if side forces are applied to them. This is because both the abutment surfaces 156C, 158C shown are planar and parallel to each other.

However, if they are biased with significant force against each other there may be sufficient frictional force to maintain the abutment surfaces in contact and in a desired position, against a certain amount of side forces.

Additionally, even the very act of biasing two abutment surfaces against each other is a safety feature. If the structure which provides coolant is rigid enough, there may be some conditions where it may be able to withstand vibration and impact of chips. For example, providing an elongated structure in the upward and downward directions DUB, DDB will be considerably more rigid than the circular tube conduits of the prior art (having the same width in a direction perpendicular to the upward and downward directions DUB, DDB).

Notwithstanding the above-said, it is of course preferred that the embodiments of the present invention include the first safety feature (of biasing the abutment surfaces against each other). Additionally, it is even further, strongly, preferred that mechanical interlocking structures be provided.

For example, apart from being more able to withstand side forces, another advantage of the safety feature of the mechanical interlocking structure is that if there is a slight bend in either of the components, the biasing of the two opposing structures against each other may correct the misalignment of the components.

However, it was discovered during development that overly strong biasing creates a risk of unintentionally bending a (typically very thin) parting-blade (especially if one of the components is bent or tilted when mounted). Hence an overly strong biasing for a mechanical interlocking structure is also a risk.

Regardless of whether there is biasing or a mechanical interlocking structure, it is preferred that a parting-blade always be thinner than a component configured to remain within the same extended-width cutting plane PC thereof.

Still referring to FIG. 2E, as an example, assuming that the fourth interlocking structure 156 belongs to a parting-blade and the upper part belongs to an extension portion, it is generally preferred that the extension portion have a maximum extension thickness TE which is smaller than a blade's thickness dimension DT.

This is applicable for all of the biasing and mechanical interlocking structures exemplified and is yet another pre-ferred yet optional safety feature. It will be understood that such safety feature mitigates a risk of non-perfect mounting, i.e. it can compensate for tilting of the extension portion causing it to extend outside of an extended-width cutting plane PC (FIG. 6A) having a width corresponding to an insert cut width CW. It will be understood that production and aligned mounting of components having less than 4 mm width, 3 mm width and even less than 2 mm, is a significant task.

Reverting to the general discussion of mechanical struc-ture options. It should be understood that the blade mechani-cal interlocking structure can be various other structures.

In FIG. 2F there are shown sixth, seventh and eighth interlocking structures 160, 162, 164, which could equally be a mechanical interlocking structure of a parting-blade or extension portion. It will be understood that a parting-blade preferably has a male structure such as those shown in the first and third structures 148, 152, since they are easier to produce on parting-blades, but female structures are also feasible.

The sixth interlocking structure 160 comprises parallel first and second sub-edge surfaces 160A, 160B separated by a sub-edge recess surface 160C located therebetween and in turn comprising a planar recessed surface 160D.

The seventh interlocking structure 162 comprises a single concavely-curved surface 162A.

The eighth interlocking structure 164 comprises two angled (v-shaped) sub-edge surfaces 164A, 164B, similar to that shown in the second interlocking structure 150.

A different way to describe the mechanical interlocking structures is via their projections. It will also be noted that the number of projections (i.e. projecting in a direction perpendicular to a thickness dimension) there is at least one blade sub-edge projection and their position is also variable.

For example, the first interlocking structure 148 has a central, sub-edge projection 170A (constituted by the first and second blade sub-edge abutment surfaces 128B, 128C).

Alternatively, the third interlocking structure 152 could be considered to have a single non-central (or side) sub-edge projection 170B.

Alternatively, the second interlocking structure 150 could be considered to have two laterally located sub-edge pro-jections 150A, 150B.

Similarly, the other female structures (i.e. the sixth, sev-enth and eighth structures 160, 162, 164) can also be considered to have two laterally located sub-edge projec-tions 170C1, 170C2, 170D1, 170D2, 170E1, 170E2.

While a mechanical interlocking structures preferably has a uniform cross section for ease of production, it is also possible to have, as shown in FIG. 2G, a ninth interlocking structure 166 comprising a first projection 166A at one side and then after some distance a second projection 166B at the other side. This similarly can provide lateral support in both sideward directions. Notably, a tenth interlocking structure 148A configured to interlock with the ninth interlocking structure 166 can have a similar non-uniform cross-section but could also have a single, uniform, interlocking structure 148A (being identical to the first interlocking structure 148) even though the cross section of the eighth interlocking structure 166 alternates in cross-section (at least once).

In FIG. 2H, an eleventh interlocking structure 168, shows that even more than two projections (i.e. first, second and third projections 168A, 168B, 168C) is also possible.

Referring to FIGS. 3A to 5B, the coolant conduit 200 will be described in more detail.

The coolant conduit 200 comprises a body portion 202, a first extension portion 208 extending from the body portion 202, a second extension portion 210 extending from the body portion 202. The extension portions 208, 210 may be considered "arms" which project from the body portion 202. As seen below, the arms 208, 210 are configured to "grab" surfaces of the parting-blade 100.

The coolant conduit 200 in the present example is sym-metrical about a symmetry plane PS (FIG. 3D) extending through the center of the body portion 202. This is done so that the coolant conduit 200 can be used in right-hand and left-hand machining operations identically. However it should be understood that it is still feasible for the coolant conduit to extend asymmetrically.

Merely for the purposes of explaining the boundaries of what is meant by said body portion 202, it will be understood that the first and second extension portions 208, 210 are positioned (in the relatively oncoming path of a workpiece 60) and sized (elongated within an extended-width cutting plane PC) to enter a slit created by the cutting insert 14. Meanwhile, remaining portions of the coolant conduit 200, such as body portion 202 stay outside the extended-width cutting plane PC, i.e., outside the slit.

The body portion 202 will now be described in detail.

The body portion 202 comprises a first body end 220, a second body end 222 and an intermediary sub-portion 224 connecting the first body end 220 and the second body end 222.

The intermediary sub-portion 224 further comprises: an inner body surface 226, an outer body surface 228 located opposite the inner body surface 226; a first side body surface 230 connecting the inner body surface 226 and the outer body surface 228; a second side body surface 232 connect-ing the inner body surface 226 and the outer body surface 228; a first end body surface 233A and a second end body surface 233B.

The intermediary sub-portion 224 further comprises a fastening portion 234. The fastening portion 234 can be any construction configured to fasten the coolant conduit 200 to the parting-blade 100. As will be described below regarding FIG. 12, a fastening portion is not essential but is preferred as it allows user friendly fastening and removal of a coolant conduit to a parting-blade. In the present embodiments, a cam 236 (FIG. 4) is used for said fastening, but even a regular screw could be used for the biasing function (de-scribed below).

In this preferred embodiment, the fastening portion 234 comprises said cam 236, a through hole 238 extending through the first side body surface 230 and the second side body surface 232, the through hole 238 comprising first and second cylindrical edges 238A, 238B.

Figures 4, 5A, 5B, 5C, 5D, 5E, 5F:
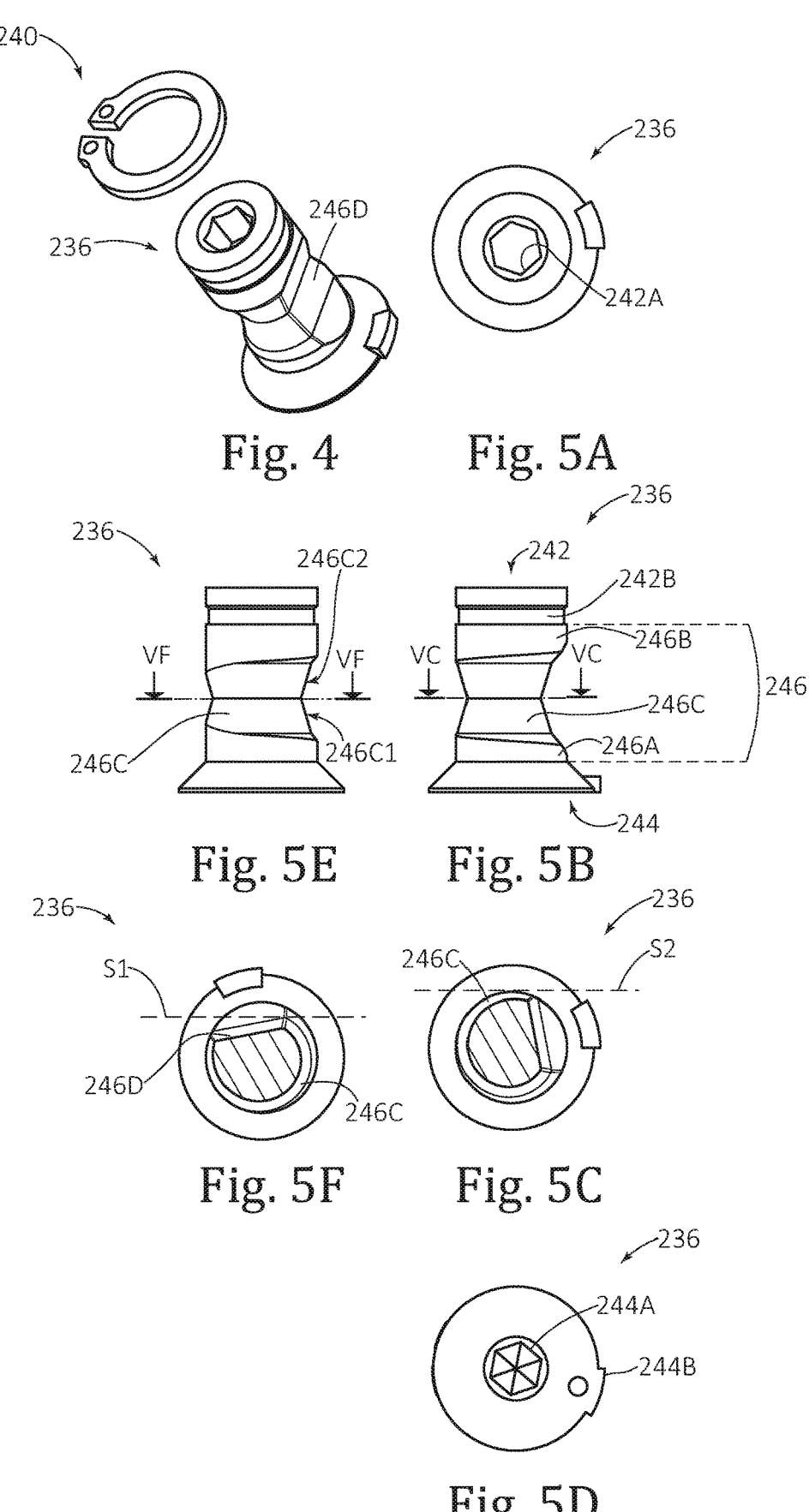
FIG. 4 is a perspective view of a fastening element of the coolant conduit in FIG. 3A.
FIG. 5A is first end view of the fastening element in FIG. 4.
FIG. 5B is a side view of the fastening element in FIG. 5A, in a fastening orientation.
FIG. 5C is a section view along the line VC-VC in FIG. 5B.
FIG. 5D is a second end view of the fastening element in an opposite direction to FIG. 5A.
FIG. 5E is a side view of the fastening element in FIG. 5A, in an insertion orientation to FIG. 5B, namely rotated about a quarter turn relative thereto.
FIG. 5F is a section view along the line VF-VF in FIG. 5E.

Referring to FIGS. 4 to 5D the cam 236 will be described in more detail.

The cam 236 is inserted through the through hole 238 and fastened in position with a circlips 240.

The cam 236 comprises a first cam end 242, a second cam end 244 and a cam intermediary portion 246 extending therebetween.

The first cam end 242 is formed with a tool receiving recess 242A via which a hex key (not shown) can rotate the cam 236 and a peripheral circlips groove 242B.

The second cam end 244 is also formed with a tool receiving recess 244A via which a hex key (not shown) can rotate the cam 236. This allows a user access to either side of the parting-blade 100.

The second cam end 244 is further formed with a cam stopper 244B configured to abut a conduit stopper 245 (FIG. 3D) allowing a user to easily know when the cam 236 is in an unfastened position so the parting-blade 100 can be inserted into the coolant conduit 200. The second cam end 244 is larger than the through hole 238 so that it cannot accidentally extend therethrough.

The cam intermediary portion 246 comprises first and second cylindrical surfaces 246A, 246B and an archimedes spiral surface 246C located therebetween.

The archimedes spiral surface 246C comprises a chamfered portion 246D (FIGS. 4 and 5F) and has a basic v-shape (first and second spiral abutment surfaces 246C1, 246C2) corresponding to the v-shaped geometry of the second and fourth blade sub-edges 112, 116.

The cam 236 is mounted to the body portion 202 by inserting it into the through hole 238 until the insertion is stopped by the second cam end 244 abutting the body portion 202, with the first and second cylindrical surfaces 246A, 246B resting on the first and second cylindrical edges 238A, 238B. The circlips 240 is the fastened to the circlips groove 242B to secure the cam 236 to the body portion 202.

A hex key (not shown) is inserted into one of the tool receiving recesses 242A, 244A to rotate the cam 236 until the cam stopper 244B abuts the conduit stopper 245 in the insertion orientation shown in FIG. 5F. A schematic line S1 shows the path of the lowest edge of the parting-blade 100 as it is slid above the cam 236 (which is done easily due to the provision of the optional yet preferred chamfered portion 246D). Notably, the parting-blade 100 is spaced-apart from the cam 236.

The hex key is then rotated in one of the tool receiving recesses 242A, 244A about a quarter turn to bring the cam 236 to a fastening orientation shown in FIG. 5B. Since the cam rotates in position (with the first and second cylindrical surfaces 246A, 246B resting on the first and second cylindrical edges 238A, 238B) the archimedes spiral surface 246C is elevated upwards and abuts the parting-blade (schematically shown by line S2). Thus the coolant conduit 200 is fastened to the parting-blade 100.

Due to the v-shaped geometry of the archimedes spiral surface 246C the first and second blade sub-edge abutment surfaces 130B, 130C (FIG. 2B) are equally abutted and the parting-blade is not tilted when lifted.

To release the coolant conduit 200 the cam is merely rotated in the opposite direction and the parting-blade is slid in the opposite direction.

Figures 3A, 3B, 3C, 3D, 3E:
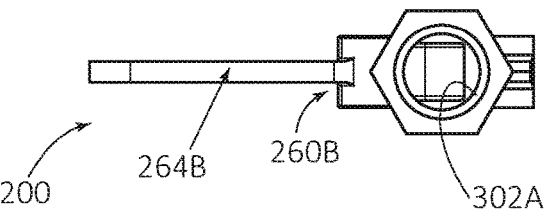
FIG. 3A is a top end view of a coolant conduit of the tool assembly in FIG. 1.
FIG. 3B is a front view of the coolant conduit in FIG. 3A, with a coolant passageway being shown schematically with dashed lines.
FIG. 3C is a side view of the coolant conduit in FIG. 3A, with a coolant passageway being shown schematically with dashed lines.
FIG. 3D is a rear view of the coolant conduit in FIG. 3A.
FIG. 3E is a bottom view of the coolant conduit in FIG. 3A.

Reverting to FIG. 3D the body portion 202 comprises an insertion gap 248 into which the parting-blade 100 is inserted. The gap has a gap thickness TG (FIG. 3B) which is larger than the blade's thickness dimension DT to allow insertion. Preferably the insertion gap 248 is larger than the cut width CW of the cutting insert so the coolant conduit 200 can be mounted on the parting-blade without having to remove a cutting insert mounted to the parting-blade. Nonetheless, to ensure minimal risk of chips being jammed between the body portion 202 and the parting-blade 100, the difference between the two widths is preferred to be as small as possible, fulfilling the condition: $DT<TG<2DT$, more preferably $DT<TG<1.4DT$.

While the insertion gap 248 is a useful symmetric geometry, it would also be possible for a coolant conduit to merely extend along one side of a parting-blade 100 (not shown). Nonetheless, it will be understood that for coolant to reach from one side of the parting-blade (in this example below the parting-blade) to the other (assuming that the coolant conduit extends to both sides of the parting-blade as shown, noting that it is possible to have two separate components, each with their own extension portion), at least a portion of such parting-blade needs to extend outside a cutting zone ZC0

The first extension portion 208 extends from the second body end 222 and the second extension portion 210 extends from a portion of the body portion 202 which is proximate to the first body end 220.

The coolant conduit 200 further comprises a coolant passageway 300.

The coolant passageway 300 comprises an inlet 302 formed at the first body end 220, a first outlet 304, a first intermediary passageway 306 extending from the inlet 302 to the first outlet 304, a second outlet 308, and a second intermediary passageway 310 extending from the inlet 302 to the second outlet 308.

In the present example the inlet 302 is internally threaded 302A and has an external hex configuration 302B so the coolant conduit 200 can be secured when attaching a supply pipe. First and second flats 302C, 302D of the hex configuration 302B are parallel with the cutting plane PC to ensure there isn't too much lateral projection by the coolant conduit 200.

It will be noted that the body portion 202 is significantly larger (bulkier) than the thin elongated first and second extension portions 208, 210. This is because outside of a cutting zone ZC a more structurally strong (and hence larger) construction can be provided.

However, the size of the body portion 202 limits a cut depth CD that an assembly 10 can provide. To elaborate, the body portion 202 extends, and remains, outside of the slot during a parting or grooving operation, i.e., outside the extended-width cutting plane PC, and therefore limits the depth of cut CD. It is also positioned between the workpiece and the blade holder 12 so the parting-blade 100 is necessarily provided with an additional overhang equal to a body height HB (FIG. 3C) defined between the inner body surface 226 and the outer body surface 228.

It was initially a concern that the additional overhang would be significantly detrimental to machining stability, however during testing it was found the present assembly 10 was even more stable than would have been thought.

Nonetheless, preferably the body intermediary sub-portion 224 is arc-shaped (i.e. concavely-shaped) to minimize the additional overhang caused thereby. The body intermediary sub-portion 224 is divided into two parallel sub-intermediary branches which define the insertion gap 248 while still allowing considerable coolant therethrough.

Each of the first and second extension portions 208, 210 comprises a near extension end 260A, 260B (connected to the body portion 202), a far extension end 262A, 262B (further from the body portion 202 than the associated near extension end of the same extension portion), an elongated intermediary extension sub-portion 264A, 264B, an inner extension surface 266A, 266B, an outer extension surface 268A, 268B located opposite the inner extension surface 266A, 266B, a first side extension surface 270A, 270B connecting the inner extension surface 266A, 266B, and the outer extension surface 268A, 268B, a second side extension surface 272A, 272B connecting the inner extension surface 266A, 266B, and the outer extension surface 268A, 268B, a front extension surface 274A, 274B located at the far extension end 262A, 262B and connecting the inner, outer, first side and second side extension surfaces 266A, 266B, 268A, 268B, 270A, 270B, 272A, 272B.

Elements of the first extension portion 208 will now be described in detail. Since the first and second extension portions 208, 210 are identical, less detail may be used to describe the second extension portion 210.

The near extension end 260A is connected to the body portion 202 and more precisely to the second body end 222.

The inner extension surface 266A comprises at the far extension end 262A an extension safety projection 278A.

The inner extension surface 266A further comprises at the far extension end 262A a first extension mechanical interlocking structure 280A which is located closer to the near extension end 260A than the extension safety projection 278A.

The inner extension surface 266A further comprises at the intermediary extension sub-portion 264A a second extension mechanical interlocking structure 282A.

Both the first and second extension mechanical interlocking structures 280A, 282A of the inner extension surface 266A comprise (FIG. 2D) a central nadir 290A and first and second extension sub-edge abutment surfaces 292A, 294A extending from the nadir 290A.

As best shown in FIG. 3C there is a slight recess (or relief) between the first extension mechanical interlocking structure 280A proximate the far extension end 262A and the second extension mechanical interlocking structure 282A at the intermediary extension sub-portion 264A. A gap between the first reference plane PR1 (described below) and the inner extension surface 266A shows the recess (or relief) between the inner extension surface 266A and the second extension mechanical interlocking structure 282A This is because the intended abutment area of the inner extension surface 266A (also called "first extension abutment surface") and the parting-blade 100 is primarily or only at the far extension end 262A (and in this example the first extension abutment surface is formed with a mechanical interlocking structure, i.e. the first extension mechanical interlocking structure 280A). The reason for the desire to specifically abut the inner extension surface 266A at the far extension end 262A is, inter alia, a safety measure to ensure that the far extension end 262A is firmly biased against the parting-blade 100 to reduce the likelihood of oncoming chips becoming lodged therebetween. Nonetheless, it is a feasible option to have a planar inner extension surface 266A which also abuts a parting-blade at the intermediary extension sub-portion thereof.

The intermediary extension sub-portion 264A is provided with said second extension mechanical interlocking structure 282A to reduce the gap between the parting-blade and the inner extension surface 266A to reduce the likelihood that chips will become lodged therebetween.

For explanatory purposes only, a first reference plane PR1 (FIG. 3C) can be defined by the first extension mechanical interlocking structure 280A proximate the far extension end 262A. This reference is chosen since it is the abutment area with the parting-blade 100.

As best shown in FIG. 3C, the extension safety projection 278A extends underneath the first reference plane PR1 thus it will extend below the second blade sub-edge 112.

The first extension mechanical interlocking structure 282A extends above (or is "recessed" or "relieved" as described above) the first reference plane PR1, thus it will be relieved from the parting-blade.

A first forward direction DF1 is defined parallel with the first reference plane PR1 and in the direction from the near extension end 260A towards the far extension end 262A.

A first rearward direction DR1 is defined opposite to the first forward direction DF1.

A first upward direction DU1 is defined perpendicular to the first reference plane PR1 and in the direction from the inner extension surface 266A towards the outer extension surface 268A.

A first downward direction DR1 is defined opposite to the first upward direction DU1.

A first sideward direction DS1 is defined opposite to a second sideward direction DS2, both directions extending perpendicularly away from the symmetry plane PS.

A first elongation axis AE1 is defined through the center of the first extension portion 208.

The first elongation axis AE1 and the first reference plane PR1 subtend an acute coolant angle $\varepsilon$ (FIG. 4C) in the first rearward direction DR1. This is to ensure the coolant is directed towards the cutting insert 14, and preferably towards a cutting edge thereof.

The front extension surface 274A is a slanted deflection surface. To elaborate, the front extension surface 274A and the first reference plane PR1 subtend a first acute deflection angle $\mu 1$, and the inner extension surface 266A and the first reference plane PR1 subtend a second acute deflection angle $\mu 2$ which is smaller than the first acute deflection angle $\mu 1$. It will be understood that since the first extension portion 208 extends well above the cutting insert 14, there is a significant chance it will be impacted by oncoming chips. If the first deflection angle $\mu 1$ would be greater, i.e. closer to orthogonal to the first reference plane PR1, the first extension portion 208 could be significantly damaged by oncoming chips. If the first deflection angle $\mu 1$ would be smaller, similar to the second acute deflection angle $\mu 2$, the coolant would exit the coolant conduit 200 further from the cutting insert 14 and would be less effective. Additionally, a slanted outlet changes the shape/direction of coolant exiting the extension portion. Preferably the first acute deflection angle $\mu 1$ fulfills the condition: $25° \leq \mu 1 \leq 65°$, more preferably $35° \leq \mu 1 \leq 55°$.

If the second acute deflection angle $\mu 2$ would be larger the first extension portion 208 would be significantly stronger (since the extension portion would have a more elongated cross section, adding rigidity against bending backwards when impacted by a chip). However this would result in a less compact construction (discussed below in relation to height HE shown in FIG. 6C). In the present example where there are two extension portions and the coolant conduit 200 is rotationally symmetrical for right and left handed tools, it would also increase the forward projection of the tool assembly and limit the size of a workpiece which can be parted. Preferably the second acute deflection angle $\mu 2$ fulfills the condition: $2° \leq \mu 2 \leq 15°$, more preferably $4° \leq \mu 2 \leq 10°$.

Yet another optional safety feature is to coat the coolant conduit, or at least the extension portion thereof, or at least the far extension end 262A thereof, with a heat resistant or protective coating.

The first and second side extension surfaces 270A, 272A are preferably parallel and extend perpendicular to the first reference plane PR1. This allows a maximum amount of coolant to be conveyed while still maintaining the first extension portion 208 within the extended width of cutting plane PC (N.B.—in this context, the extended width of the cutting plane PC ("extended-width cutting plane PC") is defined to be the same width as the cutting edge width CW of the cutting insert 14; stated differently the extended-width cutting plane PC is defined by the location of the forward-most cutting edge 34, has the same width as the cutting edge width CW of the cutting insert 14 and is parallel to the feed direction, which is the blade forward direction DFB, noting that the extended-width cutting plane PC consequently extends in all four directions of this plane, i.e. the blade forward direction DFB, the blade rearward direction DRB, the blade upward direction DUB and the blade downward direction DDB). Stated differently, an extension thickness TE (FIG. 6A) defined from the first side extension surface 270A to the second side extension surface 272A is smaller than a cut width CW of the cutting insert 14. This provides relief so that the first extension portion 208 does not impact the workpiece. Typically, the blade's thickness dimension DT is always smaller than the cut width CW for the same reason. As a safety precaution, it is preferred that the maximum extension thickness TE is smaller than even the blade's thickness dimension DT to provide relief should undesired tilting occur during mounting. While this reduces the amount of coolant which can be supplied through the thinner extension portion, the danger of impact is more significant.

Nonetheless, in all embodiments, since the portions of the coolant conduit which are within the cutting zone (and hence within the extended-width cutting plane PC) are by definition very thin in the first and second sideward directions, it is preferred that they be elongated in the upward and downward (height) directions in a side view of the coolant conduit (FIG. 3C). This can allow structural strength (even in cases where the extension portions are devoid of a coolant passageway) and can increase the coolant passageway cross section (and hence coolant supply) in cases where there is a coolant passageway. However, since there are limiting factors (such as increasing the risk of impact by chips; or to merely maintain compactness for exchanging tools in an automatic tool changer) there is a preferred limit to the height extent that an extension portion can have.

Figure 6A:
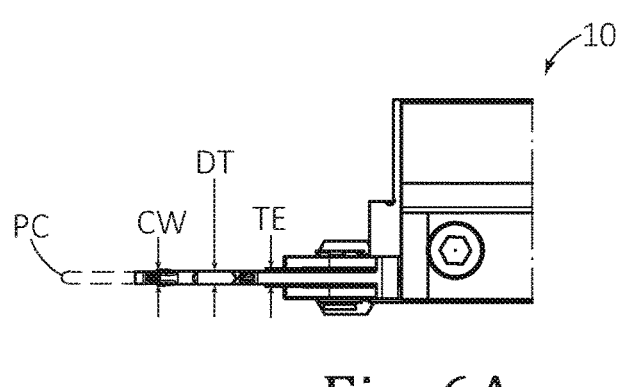
FIG. 6A is a partial top view of the tool assembly in FIG. 1.
Figures 6B, 6C, 6D:
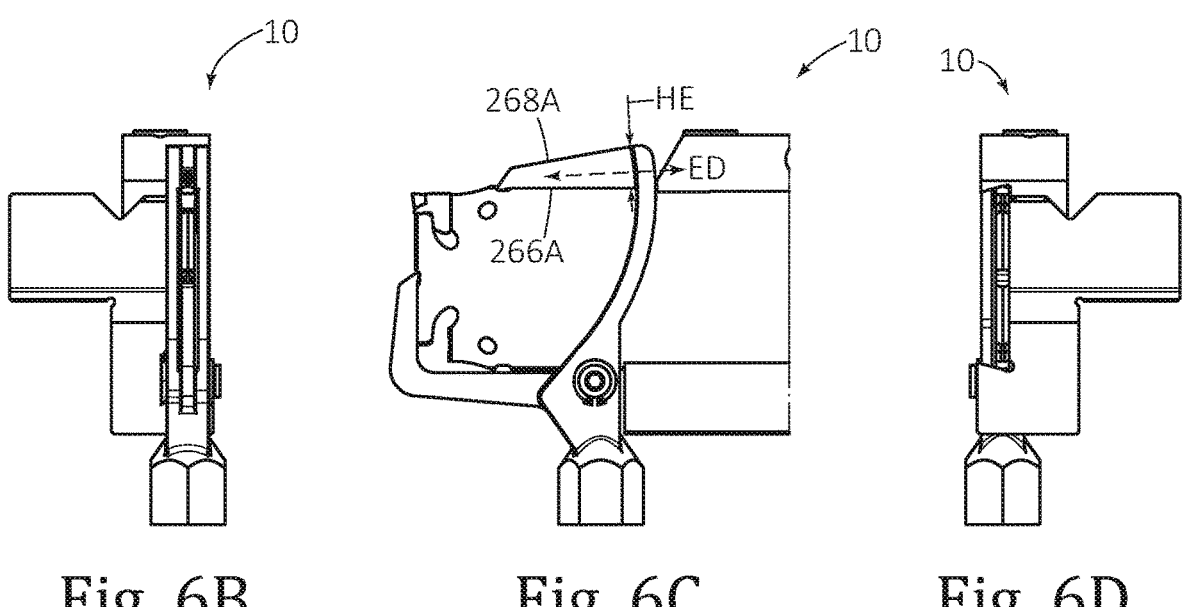
FIG. 6B is a front view of the tool assembly in FIG. 6A.
FIG. 6C is a partial side view of the tool assembly in FIG. 6A.
FIG. 6D is a rear view of the tool assembly in FIG. 6A.

Referring to FIG. 6C, there is shown a maximum extension portion height HE, defined perpendicular to an elongation direction of the associated extension portion and from the inner extension surface 266A to the outer extension surface 268A, and a maximum extension thickness TE (FIG. 6A). Preferably these dimensions fulfill the condition: 1.5TE<HE<8TE, more preferably 2TE<HE<5TE, and most preferably 2TE<HE<4TE.

For the sake of completeness, some corresponding elements of the identical second extension portion 210 are identified in FIG. 3D, namely: an extension safety projection 278B; an extension mechanical interlocking structure 280B; a central nadir 290B; and first and second extension sub-edge abutment surfaces 292B, 294B.

Referring to FIGS. 3B and 3C, the coolant passageway 300 is noted to have a plurality of turns. More precisely, the first intermediary passageway 306 comprises a first turn 314A from the inlet 302 to the intermediary sub-portion 224; a second turn 314B (the body portion 202 also dividing into two sub-intermediary portions 306A, 306B); and a third turn 314C (which is approximately a quarter turn) to the first extension portion 208.

Similarly, the second intermediary passageway 310 comprises corresponding turns (the first two being shared with the first turn 314A, and the second turn 314B), namely first, second and third turns 316A, 316B, 316C. More precisely, the second intermediary passageway 310 comprises a first turn 316A from the inlet 302 to the intermediary sub-portion 224; a second turn 316B to the second extension portion

210; and a third turn 316C (which is approximately a quarter turn) within the second extension portion 210.

Referring to FIGS. 7A to 7B, operation of the assembly 10 parting the workpiece 60 is shown.

The workpiece 60 has a central workpiece axis AW and during machining is rotated in the clockwise direction DC as indicated.

The holder 12 is shown after it has fully entered the workpiece 60 by moving it in a feed direction corresponding to the blade forward direction DFH (FIG. 7C).

Depth of cut CD (FIG. 7A) for the present embodiment is from the forwardmost cutting edge 34 to a portion of the tool assembly 10 which is wider than the cut width CW of the forwardmost edge 34. I.e. the closest portion of the tool assembly 10 to the cutting edge which is outside of the extended-width cutting plane PC. In the example given, the closest portion is the inner body surface 226 of the coolant conduit 200.

Notably, the entire body portion 202 is outside of the cutting zone ZC and can therefore extend in front of the path of the workpiece 60 as shown in FIG. 7C.

To further define the cutting zone ZC, it will be understood that all tool assemblies are designed for a given depth of cut CD. Thus, the cutting zone is an imaginary cylinder IC (FIG. 7A) which corresponds in shape to the workpiece 60 shown, the imaginary cylinder IC being defined by a radius equal in length to the depth of cut CD (which in turn is defined from the inner body surface 226 to the forwardmost cutting edge 34 of the cutting insert 14). It will be understood that the actual workpiece diameter must be slightly smaller than the depth of cut CD to provide a tolerance (e.g. 1 mm). Outside of the imaginary cylinder IC, the coolant conduit 200 can extend in any direction and not be impacted by the workpiece 60 during parting thereof.

By contrast, to provide coolant proximate to the cutting insert 14, the first and second extension portions 208, 210 are shown extending completely within an elongated slit S formed in the workpiece 60 (FIGS. 7B to 7D).

In FIG. 7A, it is also shown how the extension safety projections 278A, 278B extend below the respective sub-edges and there is a gap G1, G2 between each extension safety projection 278A, 278B and the associated first and second blade safety recesses 132A, 132B.

It will be understood that if the extension safety projections contact the blade safety recesses then this could reduce biasing force between the intended abutment surfaces of the extension portion and blade (particularly, weakening the interlock of the mechanical interlock structures).

Referring now to FIGS. 8 to 11, there is shown a second embodiment of a coolant conduit 200'.

The coolant conduit 200' is identical to the coolant conduit 200 described above except for the fastening portion 234'.

In this preferred embodiment, the fastening portion 234' comprises a cam 236', a through hole 238' extending through the first side body surface 230' and the second side body surface 232', and, optionally, a cam insertion and removal hole 233' formed in the rear of the coolant conduit 200'.

It will be understood that the cam 236' could be advantageously produced by additive manufacturing within the body portion 202 and no cam insertion and removal hole 233' would then be necessary.

Referring to FIG. 8D, the body portion 202 comprises internal first and second slanted support surfaces 238A', 238B' adjacent the through hole 238'.

Referring to FIGS. 9A to 10D the cam 236' will be described in more detail.

The cam 236' is inserted through the cam insertion and removal hole 233' before usage.

The cam 236' comprises a first cam end 242', a second cam end 244' and a cam intermediary portion 246' extending therebetween.

The first cam end 242' is formed with a first tool receiving recess 242A' via which a hex key (not shown) can rotate the cam 236'.

The second cam end 244' is also formed with a second tool receiving recess 244A' via which a hex key (not shown) can rotate the cam 236'. This allows access to a user from either side of the parting-blade 100.

In the present embodiment the first and second tool receiving recesses 242A', 244A' are continuous (and thus could be considered a single tool receiving recess), but a stopper or wall (not shown) could be formed between them to prevent over insertion of a hex key (not shown).

The second cam end 244' exemplified is not formed with a cam stopper, but this is a feasible and preferred option, with such stopper, for example, configured to abut an internal conduit stopper (not shown) formed on the inside of the fastening portion 234'.

The cam intermediary portion 246' comprises first and second slanted surfaces 246A', 246B' and an archimedes spiral surface 246C' located therebetween.

The archimedes spiral surface 246C' comprises a chamfered portion 246D' (as seen in above FIGS. 4 to 5F) and has a basic v-shape (first and second spiral abutment surfaces 246C1', 246C2') corresponding to the v-shaped geometry of the second and fourth blade sub-edges 112, 116.

The cam 236' is mounted to the body portion 202' by inserting it into the insertion and removal hole 233' with the first and second slanted surfaces 246A', 246B' resting on the internal first and second slanted support surfaces 238A', 238B'.

A hex key (not shown) is inserted into one of the tool receiving recesses 242A', 244A' to rotate the cam 236' until it is in the insertion orientation shown in FIG. 10F. A schematic line S1' shows the path of the lowest edge of the parting-blade 100 as it is slid above the cam 236' (which is done easily due to the provision of the optional yet preferred chamfered portion 246D'). Notably, the parting-blade 100 is spaced-apart from the cam 236'.

The hex key is then rotated in one of the tool receiving recesses 242A', 244A' about a quarter turn to bring the cam 236' to a fastening orientation shown in FIG. 10B, similar to the previous embodiment, in which the archimedes spiral surface 246C' abuts the parting-blade (schematically shown by line S2').

As shown in FIGS. 11A to 11E, this exemplary fastening portion 234', advantageously has no projecting portions outside of the body portion 202.

Referring now to FIGS. 12A to 12D, there is shown a third embodiment of coolant conduit 200". Numerous differences will be described and should each be considered as independently interchangeable with the previous coolant conduit embodiments.

The exemplified coolant conduit 200" of the third embodiment is devoid of a fastening portion of the sort described with reference to the first and second embodiments. Rather, closest points of parallel first and second inner portions 211", 213" of the extension portions 208", 210" are spaced an extension distance DE1 which is smaller than the second sub-edge length LS2 creating a wedge effect or pressure fit on a parting-blade 100 extended therethrough.

In this example the second extension portion 210", or more precisely the second inner portion 213" thereof is the only portion provided with a mechanical interlocking structure 215" and the front stopper portion 217" is planar. This is possible since the mechanical interlocking structure 215" of the second inner portion 213" and a mechanical interlocking structure 219" formed on the first inner portion 211" are both relatively long. Accordingly, even a standard parting-blade (not shown) without a mechanical interlocking structure 128 along the first blade sub-edge 110 thereof can be used with such coolant conduit 200".

In this example there is no hex-shaped surface formed at the inlet 302". This is because the first body end 220 itself has been provided a shape suited to being held by a wrench (not shown).

More specifically, the oppositely facing first and second lower body surfaces 226", 228" have been spaced-apart a distance corresponding to a standard wrench size. Such wrench (not shown) can be inserted between the inlet 302" and the optional yet preferred ears 303", 305", if needed.

The present embodiment also provides an example without any extension safety projection. It will be understood that with a pressure-fit configuration it is more complicated to have a projecting portion on at least the first extension portion 208".

Referring now to FIGS. 13A to 13E, there is shown a fourth embodiment of a coolant conduit 200'''.

Since the exemplary embodiments above restrict the variable overhang capability of the parting-blades, one solution is to provide the shown coolant conduit 200''' which encircles (not shown) the blade holder 12 (FIG. 1) and therefore the cutting zone ZC extends from the cutting insert 14 to the holder 12 since no portion of the coolant conduit 200''' extends therebetween.

Similar to the previous embodiments, the parting-blade 100 can be inserted through an insertion gap 248''' until abutting mechanical interlocking structures formed on portions of the extension portions (for example: on the lower portion 213''' and/or the stopper portion 217''', and the portion designated 211''').

The shown example has elongated portions 221''', 223''' which are about the length of the holder 12 yet do not need to be as thin as the extended-width cutting plane PC (the thinner portions are designated 211''', 213''' and 217''', as well as transition portions 225''', 227''' extending therebetween).

A biasing screw (not shown) can be used to ensure a fixed position (by biasing etc.) of the coolant conduit 200''' relative to the parting-blade. For this the coolant conduit 200''' could be formed with a threaded screw-receiving hole (not shown) in any of the portions designated 229''', 231''', 233'''.

Figures 14A, 14B, 15A, 15B:
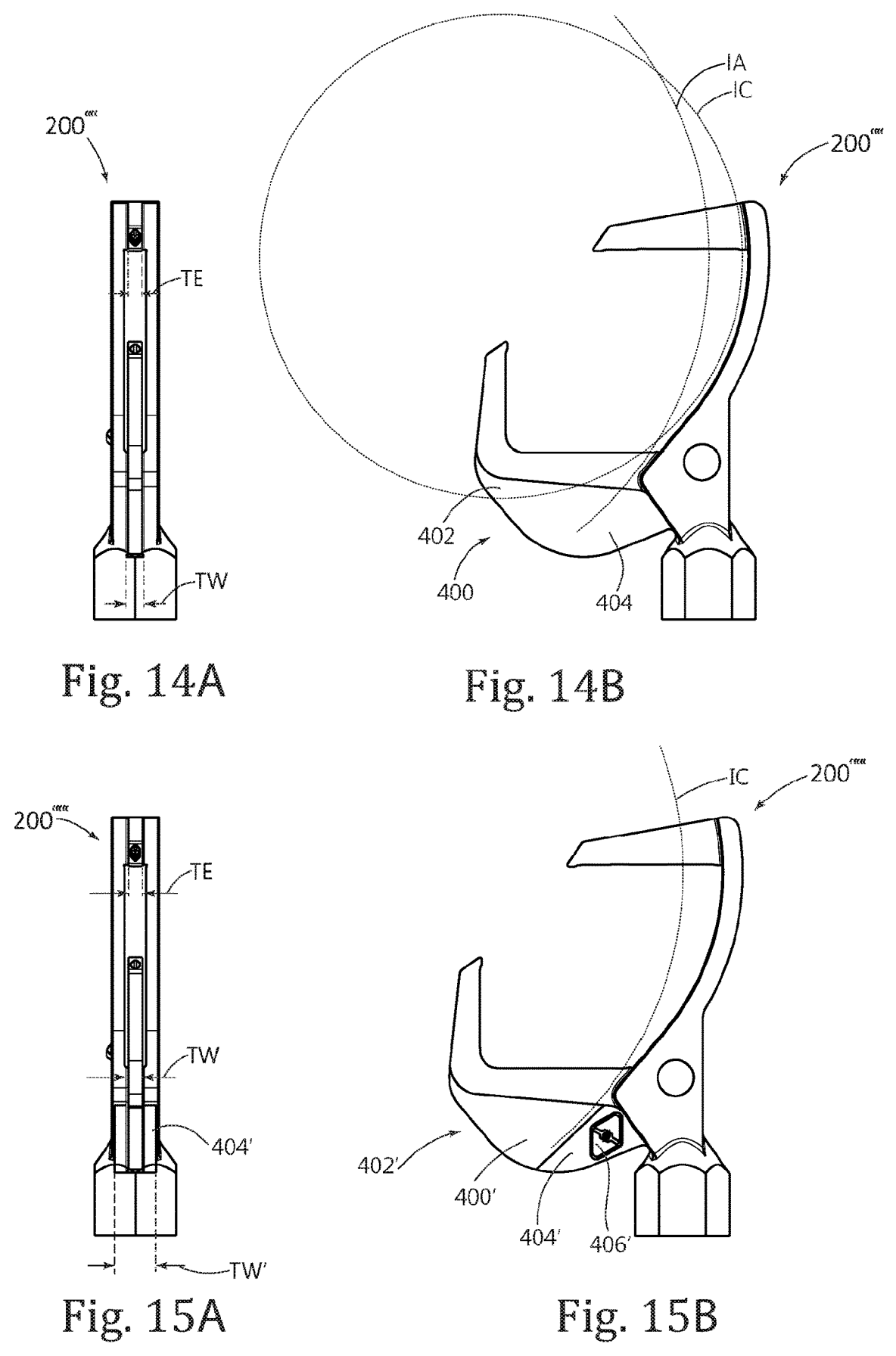

Referring now to FIGS. 14A and 14B, there is shown a fifth embodiment of a coolant conduit 200''''.

During development, it was discovered that by hanging a coolant conduit on an overhanging parting-blade, unusual stability was achieved (when it was expected that there would be less stability due to the increased overhang needed, as described above). Without being bound to theory, it is believed that the coolant conduit acted as a damping weight, creating an anti-vibration effect.

The coolant conduit 200'''' corresponds to the previous embodiments except that to increase said anti-vibration effect, an extra weight-portion 400 has been added (optionally, but preferably integrally formed therewith).

Preferably, the weight-portion 400 is as close to the cutting insert (not shown) as possible, and therefore at least a first weight part 402 of the weight-portion 400 within the cutting zone ZC should be thin. More precisely, said first weight part 402 should have a weight thickness TW approximately the same as or no wider than an extension thickness TE.

It will be understood that while a depth of cut is defined by the imaginary cylinder IC shown, such assemblies can groove even larger diameter workpieces (since reaching the center of a workpiece is only required for parting), thus a maximum grooving dimension is shown by the imaginary arc designated IA whose diameter is larger than a diameter of a workpiece than can be parted.

As noted, a second weight part 404 of the weight-portion 400 is outside of both the imaginary cylinder and imaginary arc zones (i.e. the cutting zone ZC) and therefore could be widened if desired.

Referring now to FIGS. 15A and 15B, there is shown a sixth embodiment of coolant conduit 200'''''.

In this example, the weight-portion 400' comprises a first weight part 402' within the cutting zone ZC and hence having the same thickness TW as the extension thickness TE, and a second weight part 404' outside of the cutting zone.

The second weight part 404' comprises an anti-vibration device 406' (examples of which can be found in the Applicant's previous patent publications such as U.S. Pat. No. 9,993,876)

Notably, the second weight part 404' has a second part width TW' significantly greater than the extension thickness TE.

Referring to FIGS. 16A to 18B, there is illustrated another coolant conduit 2000 configured to be fastened to another parting-blade 1000, having, optionally, an identical cutting insert 14 to that described above.

As the basic principles are the same as those described above, only notable differences will be elaborated.

Figures 17A, 17B, 17C, 18A, 18B:
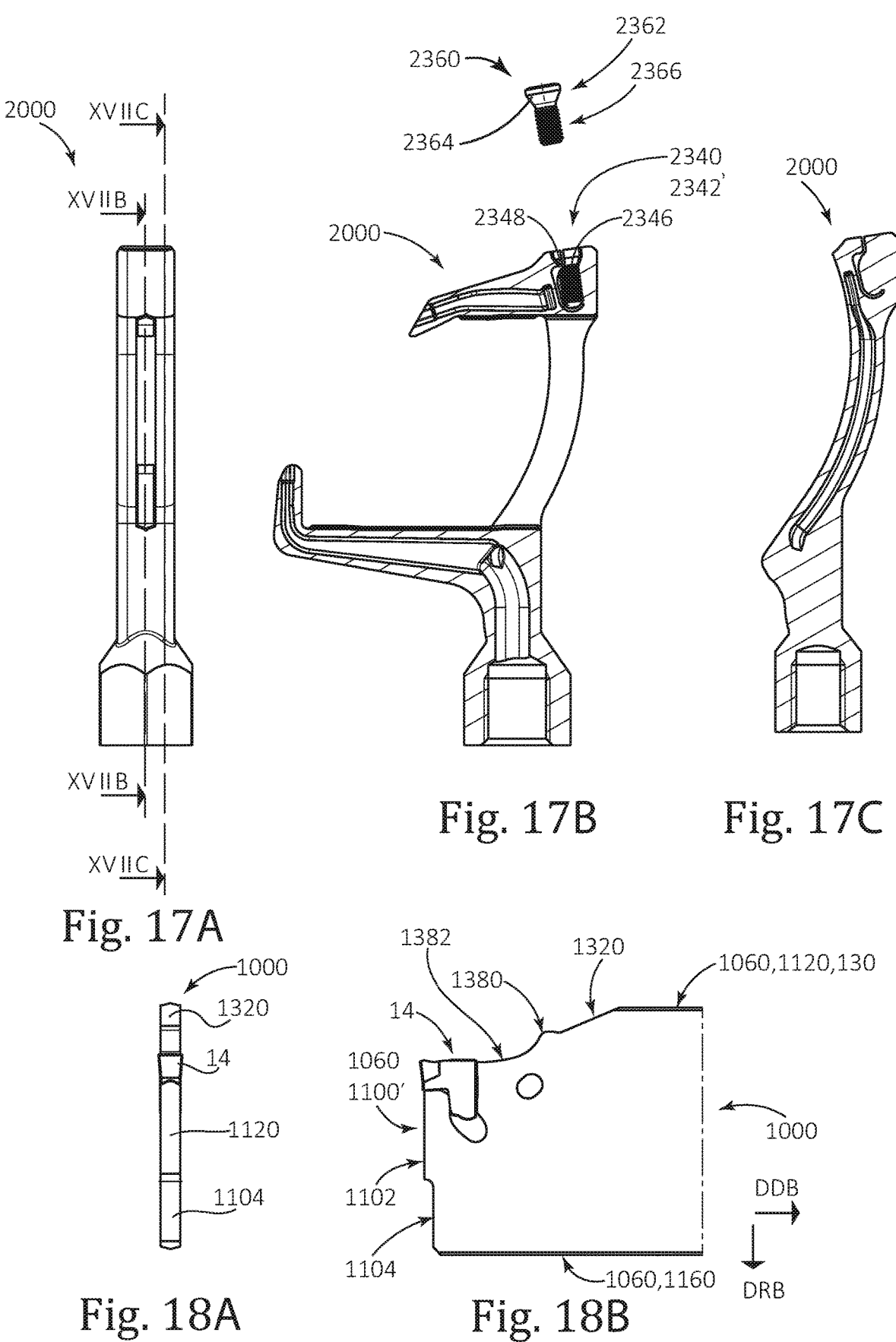
FIG. 17A is a front view of the coolant conduit in FIG. 16A.
FIG. 17B is a side view of the coolant conduit in FIG. 16A, also showing a fastening element (screw), the coolant conduit being shown as a section view along the line XVIIB-XVIIB in FIG. 17A.
FIG. 17C is a side view of the coolant conduit in FIG. 16A, the coolant conduit being shown as a section view along the line XVIIC-XVIIC in FIG. 17A.
FIG. 18A is a side view of a part of another embodiment of a parting-blade configured for use with the coolant conduit in FIG. 16A.
FIG. 18B is an end view of the part of the parting-blade in FIG. 18A.

Referring to FIGS. 18A and 18B first, the parting-blade 1000 comprises an identical insert pocket 118 yet a different peripheral blade edge 1060 to that shown previously.

Only shown are the peripheral blade edge's first, second and third blade sub-edges 1100, 1120, 1160 (even though in the previous example what is called here a "third" blade sub-edge is called a "fourth" blade sub-edge, noting the overall parting-blade shape is not essential for the principle being shown which is primarily an alternative fastening arrangement).

The first blade sub-edge 1100 unlike previous examples is devoid of a blade mechanical interlocking structure. Stated differently, it is planar-shaped. This allows the parting-blade to be advantageously produced with only blade mechanical interlocking structures along the traditional opposing second and third blade sub-edges 1120, 1160. On the other hand, there is more risk of a far extension end 2620B being dangerously misaligned with the parting-blade 1000 during operation, however this risk is advantageously (yet optionally) reduced by reducing the length of the second extension portion 2100 at the far extension end 2620B, and/or by the second extension portion 2100 having a comparatively long mechanical interlocking structure along a first inner extension surface 2660B at the near extension end 2600B thereof.

More precisely, the first blade sub-edge 1100 comprises a proximate first blade sub-edge portion 1102 which is proximate to the insert pocket 118, and a distal first blade sub-edge portion 1104 which is distal to the insert pocket 118.

Both the proximate and distal first blade sub-edges 1102, 1104 are planar shaped, however the distal first blade sub-edge portion 1104 is recessed in a blade rearward direction DRB and therefore also constitutes a first safety recess 1104.

The recessed first safety recess 1104 can extend to the third blade sub-edge 1160. Stated differently, it can extend to the corner of the parting-blade.

More precisely, the second blade sub-edge 1120 is formed with a second blade mechanical interlocking structure 130 corresponding to that exemplified above.

The second blade sub-edge 1120 is formed with a blade safety recess 1320 (which in this example can be elongated.

Similar to previous embodiments, the second blade safety recess 1320 extends more in the downward direction DDB than a forwardmost point 1380 of the second blade sub-edge 1120 located between the first insert pocket 118 and the additional second blade safety recess 1320. Thus, there is protection provided to the coolant conduit 2000 against oncoming chips.

Forward of the forwardmost point 1380 can be a typical relieved portion 1382.

Referring now to FIGS. 16A to 17C, there is a fastener 2360 (which in this example is a standard screw) comprising a conical screw head 2362 having a frustoconical abutment surface 2364 and a threaded shank 2366.

The coolant conduit 2000 comprises a body portion 2020, a first extension portion 2080 extending from the body portion 2020, a second extension portion 2100 extending from the body portion 2020.

The body portion 2020 most notably comprises an alternative fastening portion 2340, which comprises a threaded screw-bore 2342 and a flexibility slit 2344.

The threaded screw-bore 2342 comprises a threaded portion 2346 and a frustoconical abutment portion 2348.

The first extension portion 2080 can comprise a near extension end 2600A, a far extension end 2620A, a first inner extension surface 2660A proximate to the near extension end 2600A and formed with a mechanical interlocking structure (as described above), and a second inner extension surface 2662A which is planar (and hence suitable for abutment to the blade safety recess 1320 although in the present embodiment not intended to contact same).

The second extension portion 2100 can comprise a near extension end 2600B, a far extension end 2620B and a bend 2630B therebetween. A first inner extension surface 2660B is proximate to the near extension end 2600B and is formed with a mechanical interlocking structure (as described above), and a second inner extension surface 2662B which is planar (and hence suitable for abutment to the distal first blade sub-edge 1104, which in the present embodiment it is intended to contact as a stopper, although the function could be carried out by the inner extension surface 2662A and blade safety recess 1320 in a different embodiment).

It will be understood that either safety recess could be omitted and only one used.

It will be understood that either one or both of these safety recesses also constitute a stopper (i.e. there is desired contact with the coolant conduit 200).

For the present example, mounting the coolant conduit 2000 to the parting-blade 1000: the parting-blade 1000 is inserted in the coolant conduit 2000 until the distal first blade sub-edge portion 1104 abuts the second inner extension surface 2662B. Then the fastener 2360 is rotated/threaded to the fastening portion 2340 such that the frustoconical abutment surface 2364 biases the first extension portion 2080 forward such that the mechanical interlocking structure thereof firmly engages the second blade mechanical interlocking structure 130 of the second blade sub-edge.

To release the coolant conduit 2000 the fastener 2360 is merely rotated in the opposite direction and the parting-blade 1000 is slid in the opposite direction.

Figure 6E:
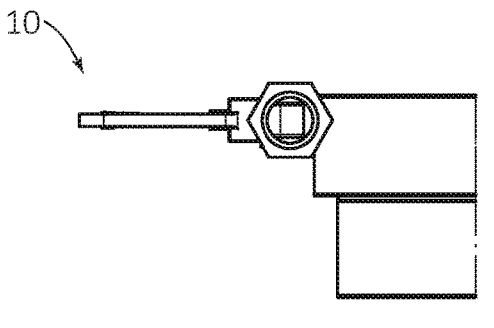
FIG. 6E is a partial bottom view of the tool assembly in FIG. 6A.
Figure 11A:
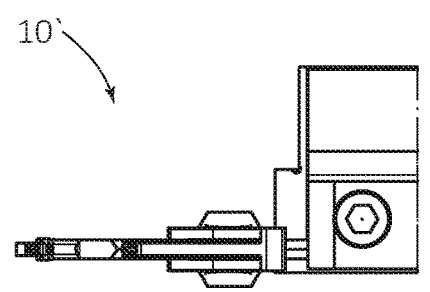
FIG. 11A is a partial top view of a tool assembly similar to FIG. 1 except with the coolant conduit in FIG. 8A.
Figures 11B, 11C, 11D:
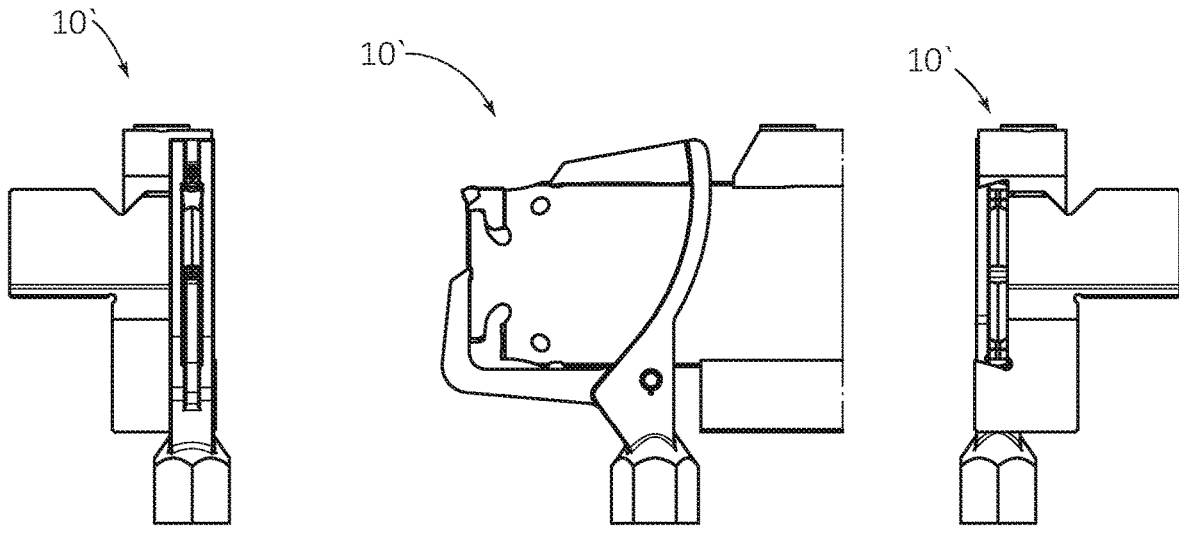
FIG. 11B is a front view of the tool assembly in FIG. 11A.
FIG. 11C is a partial side view of the tool assembly in FIG. 11A.
FIG. 11D is a rear view of the tool assembly in FIG. 11A.
Figure 11E:
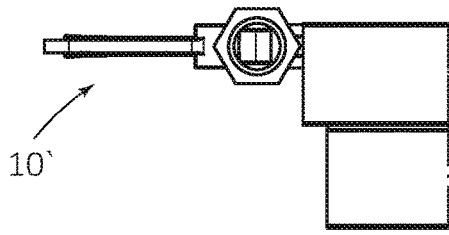
FIG. 11E is a partial bottom view of the tool assembly in FIG. 11A.
Figure 12A:
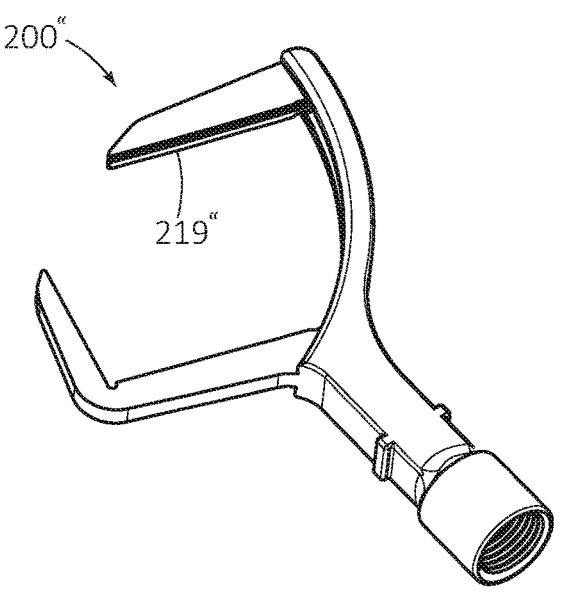
FIG. 12A is a side perspective view of a third embodiment of a coolant conduit according to the present invention.
Figure 12B:
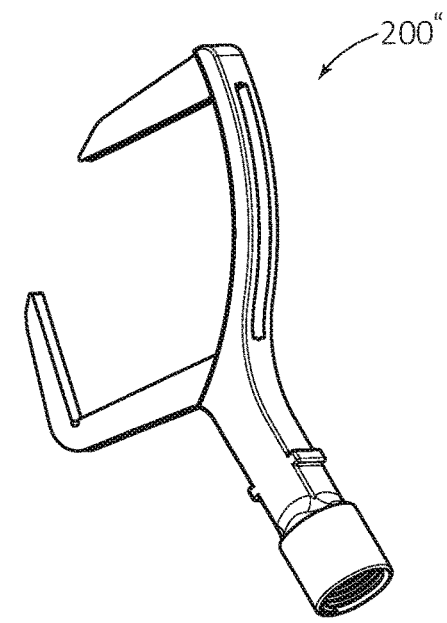
FIG. 12B is another side perspective view of the coolant conduit in FIG. 12A.
Figure 12C:
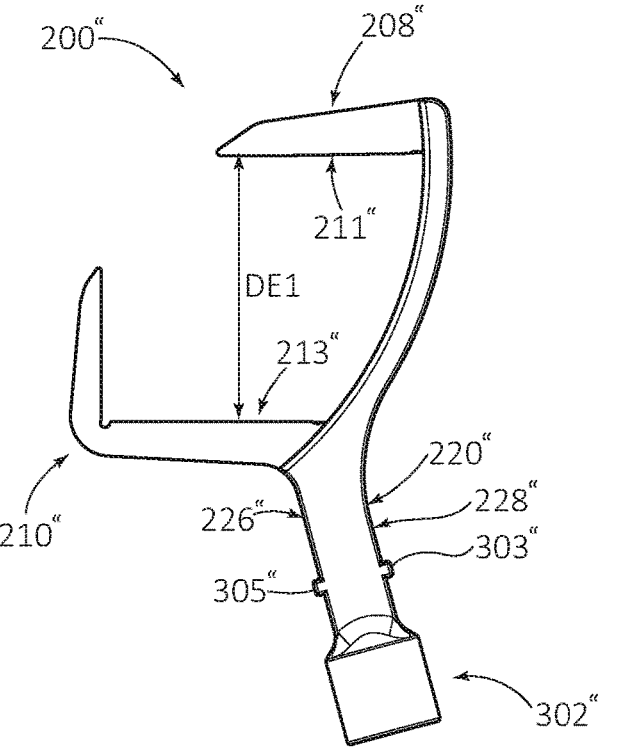
FIG. 12C is a side view of the coolant conduit in FIG. 12A.
Figure 12D:
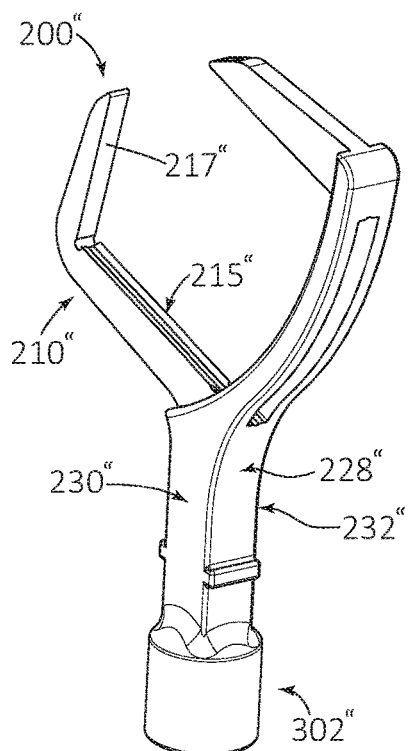
FIG. 12D is a perspective rear view of the coolant conduit in FIG. 12A.
Figures 13A, 13B, 13C, 13D, 13E:
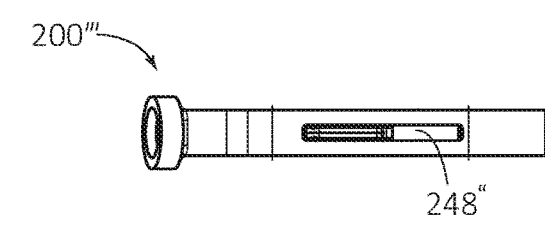
FIG. 13A is a front view of a fourth embodiment of a coolant conduit according to the present invention.
FIG. 13B is a bottom view of the coolant conduit in FIG. 13A.
FIG. 13C is a side view of the coolant conduit in FIG. 13A.
FIG. 13D is a top view of the coolant conduit in FIG. 13A.
FIG. 13E is a rear view of the coolant conduit in FIG. 13A.
Figure 16A:
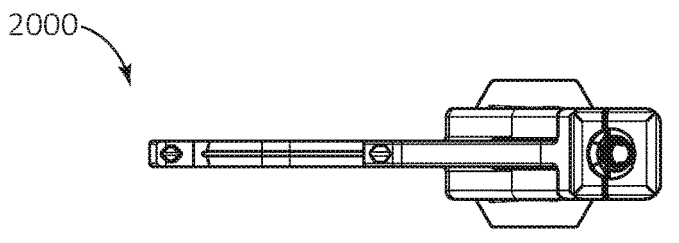
FIG. 16A is a top view of a seventh embodiment of a coolant conduit according to the present invention.
Figures 16B, 16C, 16D:
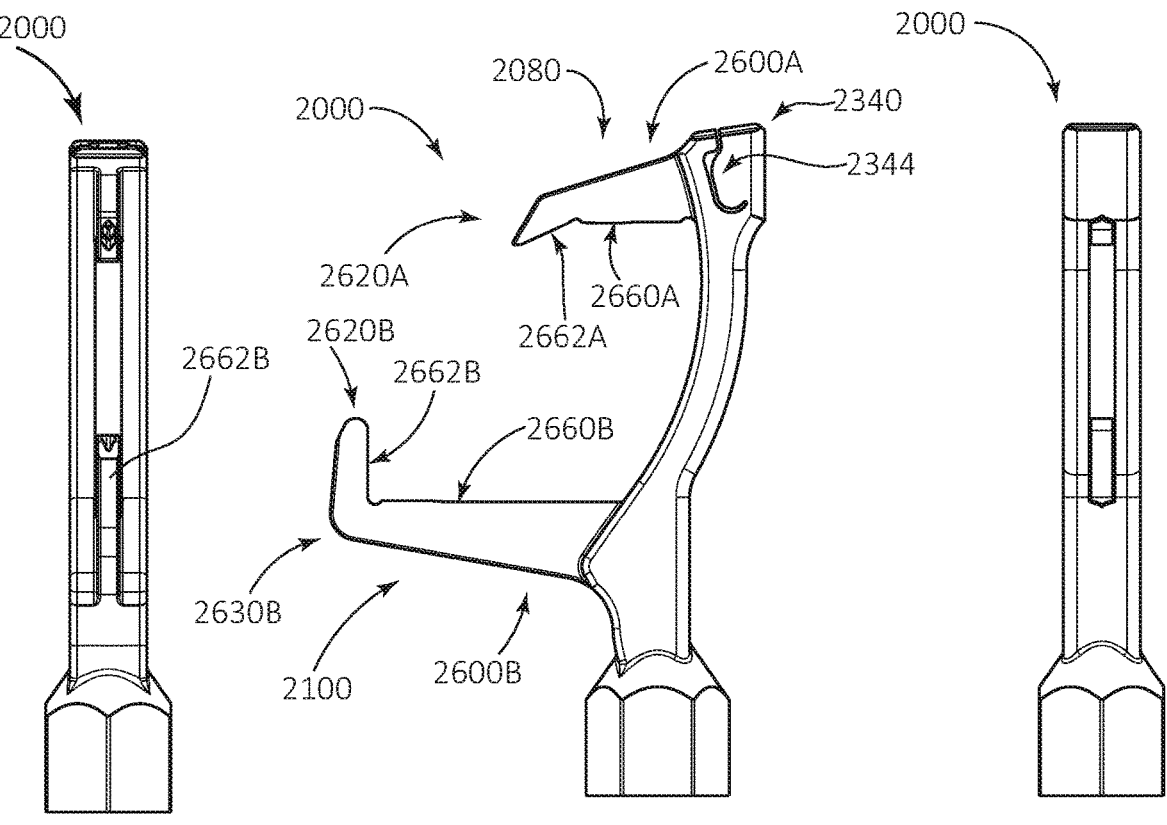
FIG. 16B is a front view of the coolant conduit in FIG. 16A.
FIG. 16C is a side view of the coolant conduit in FIG. 16A.
FIG. 16D is a rear view of the coolant conduit in FIG. 16A.
Figure 16E:
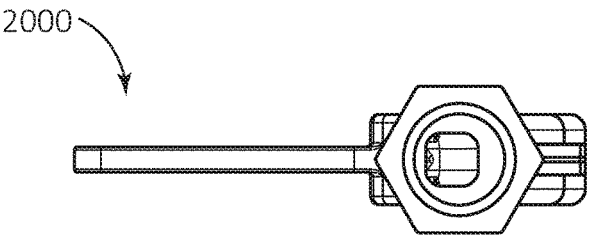
FIG. 16E is a bottom view of the coolant conduit in FIG. 16A.

In the previous embodiments shown in FIGS. 3 and 6, since the overall coolant conduits shown were rigid bodies, during fastening there was some undesired rotation thereof relative to the parting blade. In the present example (coolant conduit 2000) this was avoided by only one portion thereof (i.e. the first extension portion 2080) being dynamic or flexed relative to the remainder of the coolant conduit 2000.

A few final general comments regarding the present invention are as follows:

It is hitherto unknown to fasten a component to an overhanging portion of a parting-blade to reduce vibration thereof.

Accordingly, the present invention further comprises an aspect even devoid of coolant passageways, i.e. an anti-vibration device configured to be secured to a parting-blade.

While such anti-vibration devices are known to be integrally formed with parting-blades, this is expensive, since after limited usage the parting-blade comprising an insert pocket undergoes wear from machining. By contrast, the present aspect does not undergo insert clamping or machining forces and can be conceivably reused many times.

Of course, in advantageous embodiments a coolant passageway is included for the additional benefit of added tool life of a cutting insert.

It is also preferable that the device comprise mechanical interlocking mechanisms for being fastened to the parting-blade. Although other mounting options, such as with screws, which is less preferred, is possible.

Generally speaking, the examples above have all exemplified two extension portions, however it is possible for a coolant conduit to have only one extension portion, or more than two extension portions and still benefit a parting-blade.

Finally, it is clear that all of the systems above can additionally benefit from having a coolant passageway therethrough, which in addition to said clamping, increases the tool life of a cutting insert, and at high coolant pressures even assists in chip breakage.

It will be noted that the known high-pressure parting-blades cannot reach chip pressure breakage (which by known literature occurs above approximately 100 bar (pressure exiting the parting-blade). This is because there are pressure losses in the blade holder, the transition from the blade holder to the parting-blade, the numerous turns in the blade holder and parting-blade, the small passageways through the parting-blade, etc. The coolant conduit 200 exemplified above, was tested and reach far higher coolant pressures than is known with even so-called high-pressure coolant blades, to the point where smaller chips were seen produced than at lower coolant pressures.

The invention claimed is:

1. A parting-off tool assembly comprising:
a blade holder;
a parting-blade mounted to, and clamped by, the blade holder, the parting blade comprising:
an elongated portion;
opposing first and second blade sides;
a peripheral blade edge connecting the first and second blade sides; and
a first insert pocket formed along the peripheral blade edge, the peripheral blade edge having first and second blade sub-edges extending from different sides of the first insert pocket;
a cutting insert mounted to the first insert pocket, the cutting insert comprising:

a forwardmost cutting edge defining a cutting edge width CW and an extended-width cutting plane PC which is the same width as the cutting edge width CW and extends parallel with the elongated portion of the parting-blade, the elongated portion lying within the extended width cutting plane PC; and
a coolant conduit mounted to the parting-blade, part of the coolant conduit mounted to the elongated portion, the coolant conduit comprising:
a first extension portion which is elongated and lies only within the extended- width cutting plane PC;
at least one inlet;
at least one outlet; and
at least one coolant passageway extending from the at least one inlet to the at least one outlet;
wherein the at least one outlet opens out at the first extension portion and is located within the extended-width cutting plane PC.

2. The parting-off tool assembly according to claim 1, wherein the coolant conduit does not contact the blade holder.

3. The parting-off tool assembly according to claim 1, wherein the coolant conduit contacts at least one of the first and second blade sub-edges of the parting blade.

4. The parting-off tool assembly according to claim 3, wherein the coolant conduit contacts the parting-blade only along the peripheral blade edge thereof.

5. The parting-off tool assembly according to claim 1, wherein:
the coolant conduit contacts only an overhanging portion of the parting-blade which is spaced-apart from the blade holder in one direction therefrom; or
the coolant conduit encircles the blade holder; or
the coolant conduit extends partially alongside the blade holder.

6. The parting-off tool assembly according to claim 1, wherein the coolant conduit extends both above and below the parting blade.

7. The parting-off tool assembly according to claim 1, wherein the coolant conduit is a rigid body.

8. The parting-off tool assembly according to claim 1, wherein the coolant conduit comprises an insertion gap, through which the parting-blade extends.

9. The parting-off tool assembly according to claim 1, wherein:
the coolant conduit comprises a body portion;
the first extension portion extends from the body portion; and
the body portion extends outside of the extended-width cutting plane PC.

10. The parting-off tool assembly according to claim 1, wherein:
either:
the coolant conduit further comprises a second extension portion having a part which is parallel to a part of the first extension portion; and
the coolant conduit is configured to be pressure-fit to the parting blade with a distance between the parallel parts of the first and second extension portions being smaller than a height of the parting-blade;
or:
the coolant conduit comprises a fastening portion configured to fasten the coolant conduit to the parting-blade.

11. The parting-off tool assembly according to claim 1, wherein the entire first extension portion lies only within the extended-width cutting plane PC.

12. The parting-off tool assembly according to claim 1, wherein the first extension portion comprises:

opposite inner and outer extension surfaces, and opposite first and second side extension surfaces; and an elongated extension cross section which is elongated in a direction from the inner extension surface to the outer extension surface.

13. The parting-off tool assembly according to claim 1, wherein:

in the first extension portion, the at least one coolant passageway has an elongated passageway cross section perpendicular to an elongation direction of the first extension portion.

14. The parting-off tool assembly according to claim 1, wherein the coolant passageway forks in two different directions, from the at least one inlet.

15. The parting-off tool assembly according to claim 1, wherein, in a side view of the first extension portion, the first extension portion has a linear-shape, at least at a part thereof comprising the at least one outlet.

16. The parting-off tool assembly according to claim 1, wherein the coolant conduit comprises at least three turns from the at least one inlet to the at least one outlet.

17. The parting-off tool assembly according to claim 1, wherein:

the first extension portion comprises a safety projection or safety recess; and the parting-blade comprises a complementary safety recess or safety projection.

18. The parting-off tool assembly according to claim 17, wherein the first extension portion comprises a safety projection extending from an inner extension surface thereof.

19. The parting-off tool assembly according to claim 17, wherein the safety projection is accommodated within the safety recess of the parting-blade without contacting the parting-blade.

20. The parting-off tool assembly according to claim 1, wherein the first extension portion is biased against the parting-blade's peripheral edge at a rake side of the parting-blade relative to the insert pocket.

21. The parting-off tool assembly according to claim 1, wherein the first extension portion is biased against the parting-blade's peripheral edge at a relief side of the parting-blade relative to the insert pocket.

22. The parting-off tool assembly according to claim 1, wherein the first extension portion comprises a mechanical interlocking structure and is biased against a complementary mechanical interlocking structure formed along the parting blade's peripheral edge.

23. The parting-off tool assembly according to claim 1, wherein the coolant conduit further comprises a second extension portion.

24. The parting-off tool assembly according to claim 23, wherein the first and second extension portions extend along two non-parallel blade-sub edges of the peripheral blade edge.

25. The parting-off tool assembly according to claim 1, further comprising an anti-vibration mechanism comprising a weight-part.

26. The parting-off tool assembly according to claim 1, wherein the parting blade is devoid of internal coolant channels.

\* \* \* \* \*